United States Patent
Nikolajsen et al.

(10) Patent No.: US 6,700,697 B2
(45) Date of Patent: Mar. 2, 2004

(54) REFLECTIVE ERBIUM-DOPED AMPLIFIER

(75) Inventors: Thomas Nikolajsen, Lynge (DK); Arturo Chavez-Pirson, Tucson, AZ (US); Yushi Kaneda, Tucson, AZ (US); Shibin Jiang, Tucson, AZ (US); Sergio Brito Mendes, Tucson, AZ (US); Nayer Eradat, Tucson, AZ (US)

(73) Assignee: NP Photonics, Inc., Tucson, AZ (US)

( * ) Notice: Subject to any disclaimer, the term of this patent is extended or adjusted under 35 U.S.C. 154(b) by 104 days.

(21) Appl. No.: 10/055,553

(22) Filed: Jan. 23, 2002

(65) Prior Publication Data

US 2003/0137722 A1 Jul. 24, 2003

(51) Int. Cl.[7] .............................. G02B 6/26; H01S 3/30
(52) U.S. Cl. ...................... 359/341.32; 359/343; 372/6; 372/70
(58) Field of Search ........................... 359/341.32, 343; 372/70, 6

(56) References Cited

U.S. PATENT DOCUMENTS

| | | | |
|---|---|---|---|
| 4,650,289 A | | 3/1987 | Kuwahara |
| 5,295,016 A | * | 3/1994 | Deventer .................... 359/347 |
| 5,596,448 A | | 1/1997 | Onaka et al. |
| 5,598,294 A | | 1/1997 | Uno et al. |
| 5,757,541 A | | 5/1998 | Fidric |
| 5,999,673 A | | 12/1999 | Valentin et al. |
| 6,104,528 A | | 8/2000 | Hwang |
| 6,178,044 B1 | | 1/2001 | Li et al. |
| 6,195,200 B1 | | 2/2001 | DeMarco et al. |
| 6,359,728 B1 | * | 3/2002 | Angellieri et al. .......... 359/341 |
| 6,529,318 B1 | * | 3/2003 | Kaneda et al. .......... 359/341.32 |
| 6,556,346 B1 | * | 4/2003 | Pasquale et al. .......... 359/341.5 |

FOREIGN PATENT DOCUMENTS

| JP | 124151 | * 5/1993 | |
|---|---|---|---|

OTHER PUBLICATIONS

Giles et al, Bell Labs Tech. Journal pp 207–229, 3/99.*

J.–M. P. Delavaux et al., Compensating Optical Balanced Reflective Amplifier, Optical Fiber Technology 1, 1995, pp. 162–166.

Joon Tae Ahn et al., Two–stage reflective–type erbium–doped fiber amplifier with enhanced noise figure characteristics, Optics Communications 197, 2001, pp. 121–125.

S. Nishi et al., Highly Efficient Configuration of Erbium–Doped Fiber Amplifier, ECOC '90, 1990, pp. 99–102.

Shibin Jiang et al., Net gain of 15.5 dB from a 5.1cm–long Er+–doped phosphate glass fiber, OFC 2000, pp. PD5–1–PD5–3.

Karine Seneschal et al., Er3+–Doped Alkaline Free Phosphate Glasses for Optical Fiber Amplifiers, Rare–Earth Doped Materials and Devices V, SPIE, 2001, vol. 4282, pp. 93–99.

Yongdan Hu et al., Performance of High–Concentration Er3+–Yb3+–Codoped Phosphate Fiber Amplifiers, IEEE Photonics Technology Letters, Jul. 2001, vol. 13, No. 7, pp. 657–659.

* cited by examiner

Primary Examiner—Nelson Moskowitz
(74) Attorney, Agent, or Firm—Eric A. Gifford

(57) ABSTRACT

The meters of coiled silica fiber in conventional R-EDFAs is replaced with an ultra-short high-gain waveguides formed of co-doped erbium-ytterbium multi-component glass a few centimeters in length. The compact R-EDA is pumped using non-conventional multi-mode pumps that couple to the waveguide cladding. The multi-component glasses support doping concentrations of the rare-earth ions erbium and ytterbium far in excess of levels believed possible with conventional glasses. These dopant levels in combination with the reflective scheme make a compact R-EDA with sufficient amplification possible.

72 Claims, 22 Drawing Sheets

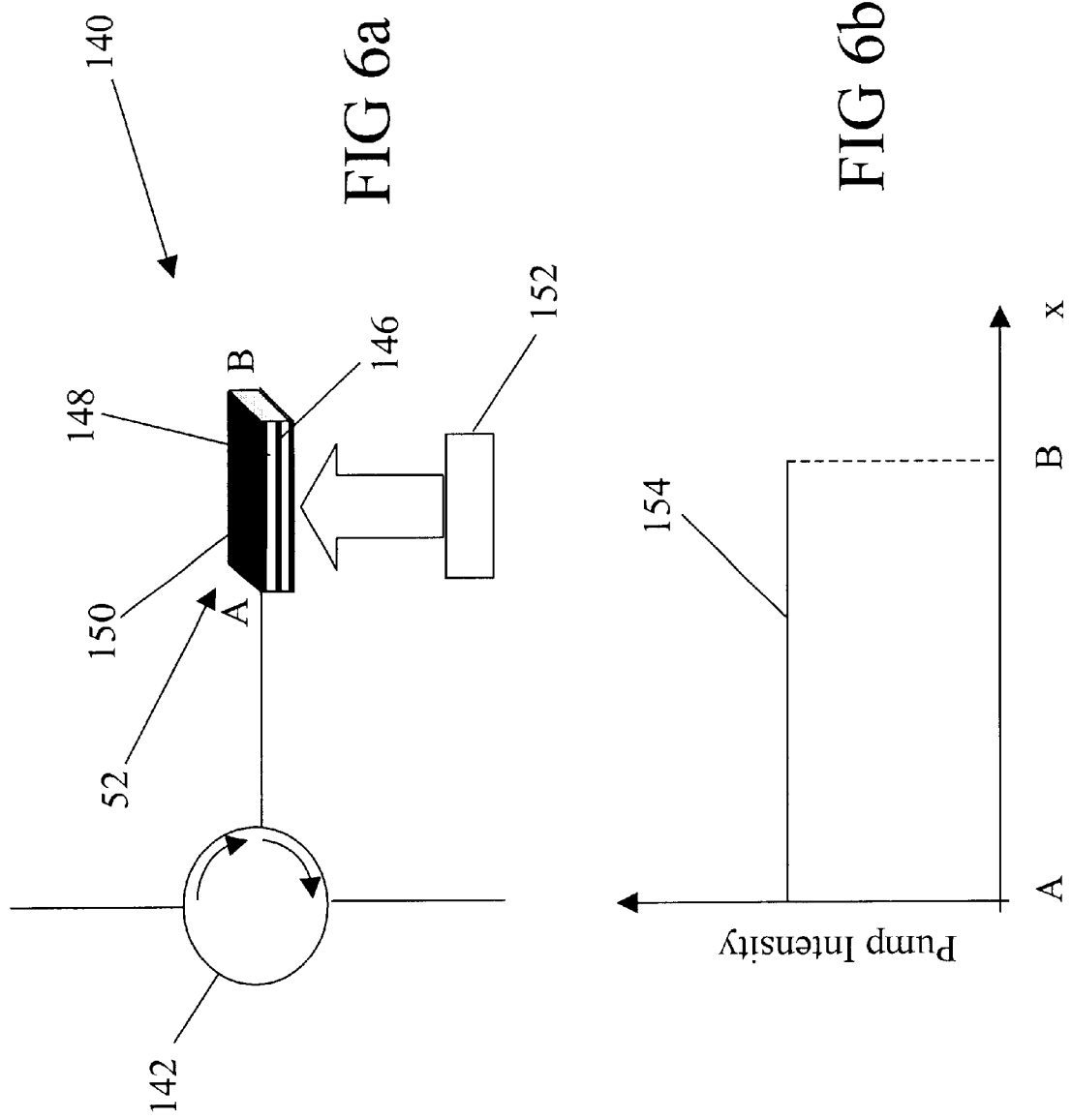

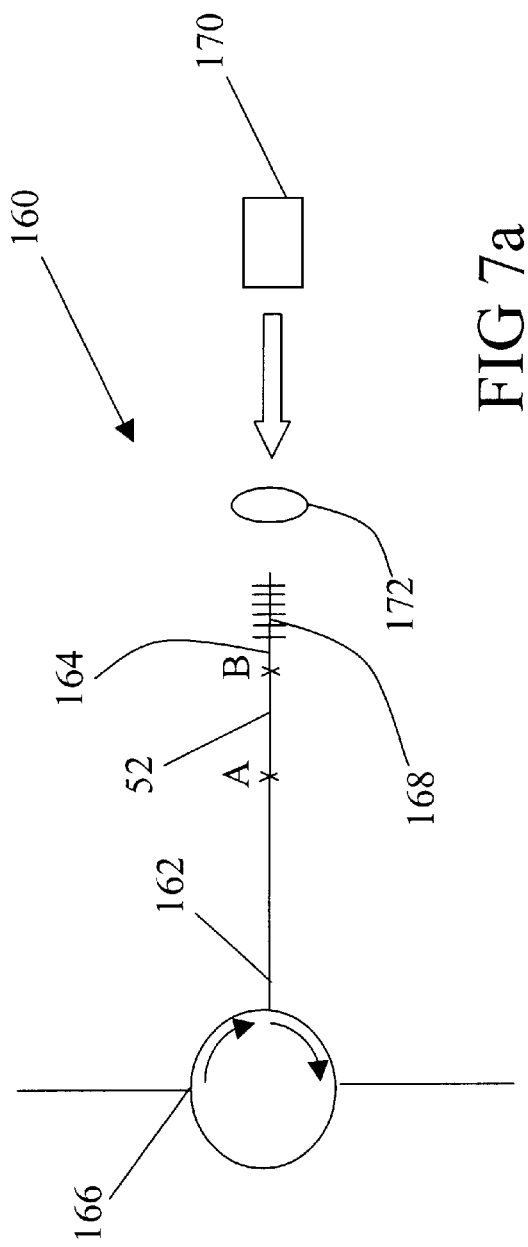
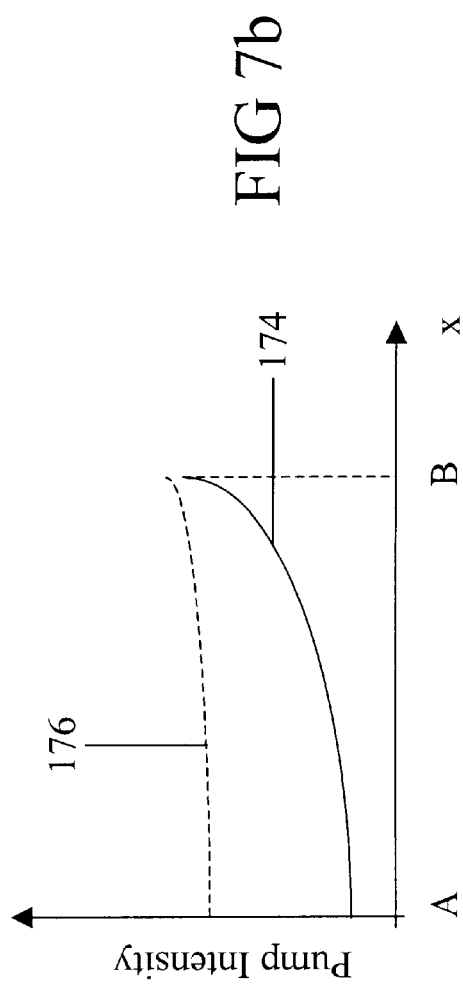
FIG 7a
FIG 7b

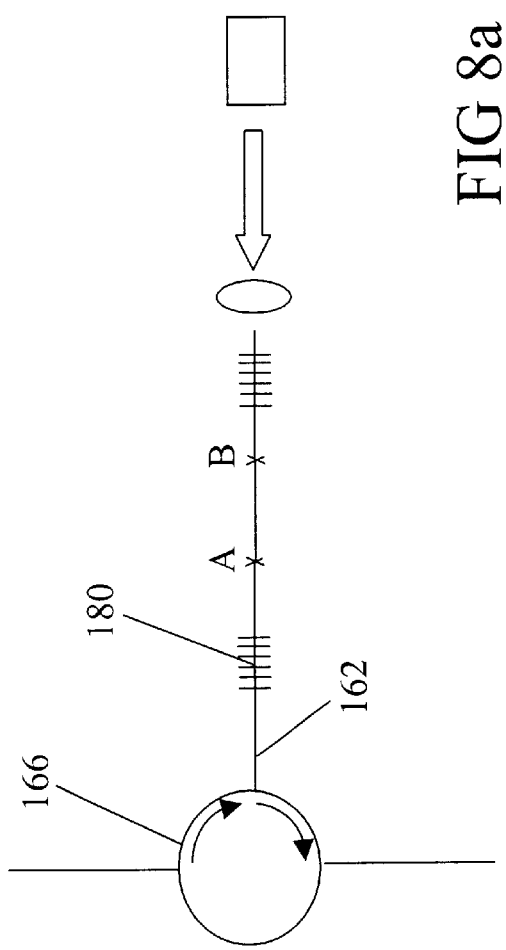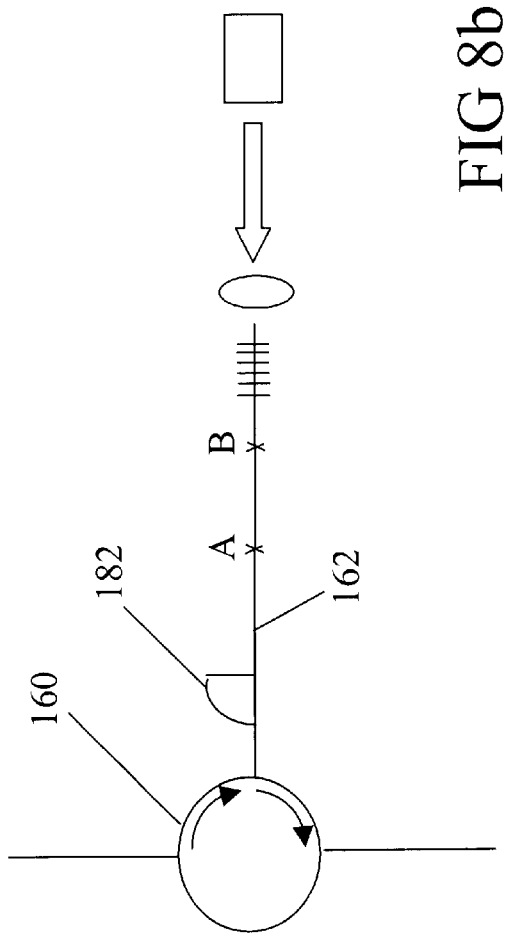

REFLECTIVE ERBIUM-DOPED AMPLIFIER

BACKGROUND OF THE INVENTION

1. Field of the Invention

This invention relates to reflective erbium-doped amplifiers (R-EDAs) and more specifically to compact reflective EDAs that use ultra-short high-gain waveguides.

2. Description of the Related Art

Significant and on-going efforts are being made on erbium-doped fiber amplifier (EDFA) schemes to improve amplifications characteristics such as gain, noise figure, saturation output power, and so on. One of the amplifier schemes used to achieve high signal gain is reflective-type EDFA (R-EDFA) as described by S. Nishi et al, "Highly efficient configuration of erbium-doped fiber amplifier", ECOC'90, vol. 1 (Amsterdam), 1990, pp. 99–102. As shown in FIG. 1a herein, R-EDFAs 10 with a 3-port optical circulator 12 and a mirror 14 placed at each end of the coiled silica erbium-doped fiber 16, respectively, give double-path amplification to input optical signals. A single-mode pump 18 is coupled to fiber 16 via a WDM coupler 20 to pump the active material in the fiber core. An input optical signal is provided at port 1 22, which directs the signal out of port 2 24 to the EDF. The reflected signal is returned to port 2, which then directs the signal out of port 3 28.

A conventional 3-port circulator 12 of the type described in U.S. Pat. No. 4,650,289 by Kuwahara is illustrated in FIG. 1b herein. This is a schematic depiction of a typical circulator, which can be implemented with many different combinations of optical elements, see for example U.S. Pat. No. 6,178,044. The conventional optical circulator includes four ports, port 1 22, port 2 24, port 3 28, and port 4 30, which is terminated to define a 3-port circulator. The optical circulator also includes polarizer prisms 32 and 34, mirrored prisms 36 and 38, Faraday rotators 40 and 42, optically active elements 44 and 46, and a collimating lens 26. The polarizer prisms 32 and 34 transmit light in different directions depending on the polarization of the light.

The polarization of any optical signal can be divided into two mutually orthogonal directions, both of which are also perpendicular to the direction of propagation of the light. Light polarized in the first direction is transmitted undeflected by the polarizer prisms 32 and 34. Light polarized in the second direction is transmitted at an angle of ninety degrees from the first direction. The mirrored prisms 36 and 38 merely reflect light without a change in polarization. The Faraday rotators 40 and 42 rotate the direction of polarization of incident light by forty-five degrees in a particular direction regardless of the direction in which light traverses the Faraday rotators. For example, the Faraday rotator 40 rotates the polarization of light from the prism 38 in the same direction as light from the optically active element 44. Optically active elements 44 and 46 rotate the polarization of incident light by forty-five degrees. However, the direction that the polarization is rotated depends upon the direction in which the light traverses the optically active elements 44 and 46. For example, optically active element 44 will rotate light from the Faraday rotator 40 and having one polarization by forty-five degrees in a particular direction. The optically active element 44 will rotate light from the polarizer prism 34 having the same polarization by forty-five degrees in the opposite direction Thus, an optical signal incident on the port 1 22 will travel a path through the mirrored prism 36, a path through the optically active element 44, of a path depending on the polarization of the optical signal. However, the elements of the conventional optical circulator 12 are chosen such that the portion of the optical signal from port 1 22 that is reflected from prism 38 will have a polarization such that it will be transmitted at ninety degrees by the polarizer prism 34. Similarly, the elements of the conventional optical circulator 12 are chosen such that the portion of the optical signal from port 1 22 that is transmitted by the optically active element 44 will have a polarization such that it will be transmitted undeflected by the polarizer prism 34. Thus, an optical signal from port 1 22 will reach port 2 24, but not be transmitted to port 3 28 or port 4 30 and similarly for each of the ports except that port 4 is terminated.

R-EDFAs that incorporate optical circulators provide significant gain improvement primarily due to double passage of the signal through the erbium-doped fiber. Reflection of the pump results in higher average inversion ratio. However, only about 20% of the single-mode core-pumped radiation is not absorbed or scattered in the meters of silica fiber on the first pass, and is available for reflection through a second pass. Thus, the effect of reflecting the pump in a silica fiber amplifier is marginal.

Typically, tens of meters of silica fiber is coiled to obtain the desired amplification. The bend radius of the fiber is typically at least 50 mm to avoid attenuation. Integrated optical systems will require compact optical components, hence smaller bend radii. The induced attenuation due to bending a SMF28 single mode fiber is 0.5 dB per turn for a 16 mm bend radius with a single-mode core pumping at 1550 nm. In cladding pumped amplifiers the limitations on bend radius are even more severe since pump light can more readily escape the cladding than the core. In addition, the bending may redistribute the pump mode shape to favor modes with smaller or no overlap with the centrally-doped core, resulting in lower pump absorption and reduced gain for the amplifier.

Furthermore, Nishi's R-EDFA exhibits severely degraded noise figure compared with the conventional single-pass EDFA because the amplified signal and backward amplified spontaneous emission (ASE) make the population inversion in the input part of the EDF low. J. Ahn et. al. "Two-Stage reflective-type erbium-doped fiber amplifier with enhanced noise figure characteristics", Optics Communications 197 (2000) pp. 121–125 Sep. 15, 2001, describes a two-stage R-EDFA to enhance noise figure. An positions the circulator to split the EDF into two segments, which prevents the amplified signal and backward ASE from propagating to the first segment. As a result, the population inversion in the first segment remains high and the noise figure is better than the conventional R-EDFA. A small amount of amplification is sacrificed.

U.S. Pat. No. 5,757,541 to Fidric entitled "Method and Apparatus for an Optical Fiber Amplifier" splits the pump light and input signal into two equal parts for simultaneous introduction into the two opposite ends of the active gain fiber. This bi-directional propagation results in a more uniform excitation along the entire length of the active fiber, providing uniform stimulation of photon emission at both ends, causing significantly reduced noise and higher gain of the signal. Fidric's OFA is not an R-EDFA and thus does not realize the enhanced gain associated with the signal passing through the active fiber twice.

U.S. Pat. No. 5,598,294 to Uno et al. entitled "Optical Fiber Amplifier and Optical Fiber Communication System" describes a R-EDFA in which the mirror is replaced by one or more wavelength selective reflectors to gain equalize different wavelength signals. This construct allows ASE outside the signal wavelengths to pass thereby improving noise figure. In one configuration, the last wavelength selective reflector is specified to reflect the pump wavelength.

U.S. Pat. No. 5,596,448 to Onaka et al. entitled "Dispersion Compensator and Optical Amplifier" provides an optical amplifier, which is not influenced by chromatic dispersion or polarization mode dispersion. As shown in FIG. 8 therein, a dispersion compensation fiber 4 is connected in cascade with the EDF in an R-EDFA configuration. The dispersion compensation fiber has color dispersion of a sign opposite that of the silica telecom fiber, and the length thereof is set so as to conform to the value of the color dispersion of the silica telecom fiber.

The reflection of the optical signal in a conventional high gain (>20 dB) silica EDFA may cause lasing in the amplifier, which is a fatal condition for an amplifier. The expense of including a circulator more than offsets any savings in fiber cost or a lower power pump. Since the silica fiber is spooled, the reflective architecture does not change the form factor of the amplifier. Finally, the complexity and expense associated with recycling the single-mode core pump is not warranted because only a relatively small amount of the pump energy is available for recycling.

SUMMARY OF THE INVENTION

In view of the above problems, the present invention provides a reflective optical amplifier that supports novel multi-mode pumping schemes, compact array configurations and integration with reflective optical components at a low per port cost for mid-gain applications.

This is accomplished by replacing the meters of coiled silica fiber with ultra-short high-gain waveguides formed of co-doped erbium-ytterbium multi-component glass a few centimeters in length. The multi-component glasses support doping concentrations of the rare-earth ions erbium and ytterbium far in excess of levels believed possible with conventional glasses. These dopant levels in combination with the reflective scheme make a compact R-EDA with sufficient amplification possible. The waveguides may be planar waveguides, optic fibers or a hybrid fiber-waveguide array.

Unlike conventional silica R-EDFAs, the integration of the reflective architecture with the ultra-short waveguide does not produce lasing, greatly enhances pump efficiency, and reduces the form factor. The compact amplifier is targeted at mid-gain (<20 dB) applications so lasing is avoided. Greater than 40% and probably about 70% of the multi-mode clad-pumped radiation is not absorbed or scattered in the ultra-short waveguide on the first pass and is available for reflection through a second pass. Since the waveguide is preferably linear and not spooled, the double-pass architecture either reduces the form factor for a given performance or enhances performance for the given form factor.

The compact R-EDA is pumped using non-conventional multi-mode pumps that couple to the waveguide cladding. A multi-mode pump can be coupled via a fused-fiber coupler, Total Internal Reflection (TIR) coupler mounted on the waveguide, to the open end of the waveguide, from the side of the waveguide or through a modified circulator. The waveguide's ultra-short form factor allows each of these pumping schemes to be configured into an array by placing a mux/demux between the circulator and a waveguide array. The compact R-EDA and R-EDA array are also well suited for integration with other reflection-type optical components such as gain flattening filters, dispersion compensators, variable optical attenuators (VOAs) or monitors.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 6a–6b illustrate the R-EDA of FIG. 2 using a side-pumping scheme and its pump profile;

FIGS. 7a–7b illustrate the R-EDA of FIG. 2 with a end coupler and its pump profile;

FIGS. 8a–8c illustrate three different schemes for recycling the pump energy in the end coupler configuration of FIG. 7a;

DETAILED DESCRIPTION OF THE INVENTION

The present invention provides a reflective optical amplifier with an ultra-short optical waveguide instead of meters of spooled fiber. The ultra-short waveguide supports novel multi-mode pumping and pump recycling schemes, compact array configurations and integration with reflective optical components at a low per port cost. The inclusion of a circulator eliminates the need for both input and output isolators that are required in most amplifier applications.

Compact R-EDA

Figure 1A:
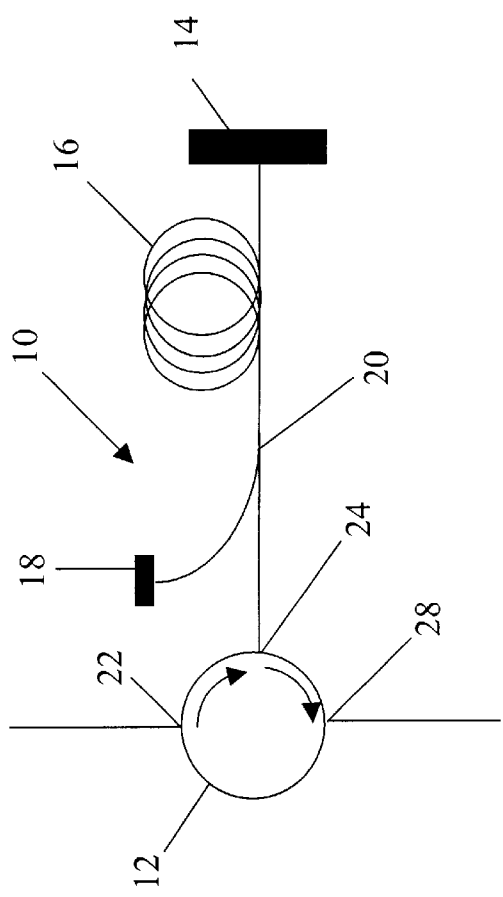
FIGS. 1a and 1b, as described above, are a schematic of a known R-EDFA using spooled silica fiber and a known 3-port circulator, respectively.
Figure 2:
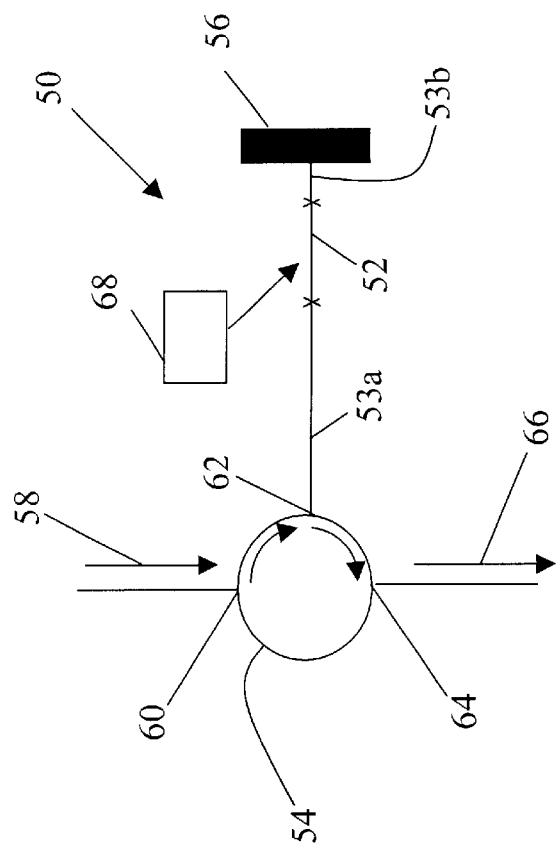
FIG. 2 is a schematic of a R-EDFA using an ultra-short high-gain waveguide in accordance with the present invention.

As shown in FIG. 2, a compact R-EDA 50 is formed by replacing the meters of coiled silica fiber 10 (shown in FIG. 1a) with an ultra-short high-gain optical waveguide 52 formed of co-doped Er:Yb multi-component glass a few centimeters in length. The ultra-short length allows the waveguide to be linear, no bending or spooling is required.

The waveguides have an active core that is surrounded by a cladding and may be configured as planar waveguides, optic fibers or a hybrid fiber-waveguide array. An optical circulator 54 and a reflector 56 (broadband or wavelength selective) are placed at each end of waveguide 52 to give double-pass amplification to input optical signals 58. As depicted in this particular embodiment, waveguide 52 is an optic fiber that is fusion spliced at splices 53a and 53b between sections of passive double-clad fiber. Optical circulator 54 has an input port 60 for receiving input optical signal 58, an I/O port 62 for coupling signal 58 to and from waveguide 52, and an output port 64 for producing the amplified optical signal 66. An optical pump 68 couples pump light into the waveguide inner cladding where it is confined by an outer cladding, air or some other lower index material.

The pump light is partially absorbed by, hence pumps, the active material in the waveguide core, thereby amplifying the optical signal. A variety of pump coupling and recycling schemes can be adopted to optimize gain, noise figure, form factor, power consumption or cost.

Co-Doped Er:Yb Multi-Component Glass Waveguide

To achieve high-gain in ultra-short lengths, e.g. 2–7 cm, the glass host must support very high Er doping concentrations to realize the necessary gain, support very high Yb doping concentration to efficiently absorb pump light in an ultra-short cavity, transfer energy efficiently from the absorbed ytterbium to the erbium and raise the saturated output power level. Compared to either silica or phosphosilicate, a multi-component glass host improves the solubility to erbium and ytterbium ions thereby allowing higher dopant levels without raising the upconversion rate and increases the phonon energy thereby reducing the lifetime of ions in the upper energy state which has the effect of improving energy transfer efficiency. The multi-component glasses support doping concentrations of the rare-earth ions erbium and ytterbium far in excess of levels believed possible with fused silica. Together these attributes provide greater than 2 dB per cm gain over a desired bandwidth, e.g. the telecomm C-band from 1530–1565 nm, with a very short fiber (2 to 10 cm), and a less expensive scheme of using a low power multi-mode pump to pump a single-mode fiber.

In general, multi-component glasses have a glass composition that contains one or more glass network formers ($P_2O_5$ phosphate, $SiO_2$ silicate, $GeO_2$ germanate, $TeO_2$ tellurite, $B_2O_3$ borate), one or more glass network modifiers MO (alkaline-earth oxides and transition metal oxides such as BaO, BeO, MgO, SrO, CaO, ZnO, PbO and mixtures thereof), and one or more glass network intermediators XO (PbO, ZnO, $WO_3$, $Y_2O_3$, $La_2O_3$, $Al_2O_3$, $B_2O_3$ and mixtures thereof). The glass network formers are selected because their glass networks are characterized by a substantial amount of non-bridging oxygen that offers a great number of dopant sites for rare-earth ions. The modifier modifies the glass network, thereby reducing its melting temperature and creating additional dopant sites. The intermediator bridges some of the bonds in the network thereby increasing the network's strength and chemical durability without raising the melting temperature appreciably. The multi-component glasses of interest thus have a much lower softening temperature than silica ($SiO_2$), which greatly simplifies processing. The fiber core is then co-doped with high concentrations of rare-earth dopants erbium and ytterbium. The cladding layer(s) are typically undoped glass.

The present invention utilizes a subclass of multi-component glasses that comprises a network former selected from ($P_2O_5$ phosphate, $GeO_2$ germanate or $TeO_2$ tellurite) of 30 to 80 weight percent; a network modifier MO of 2 to 40 weight percent (Phosphate 5 to 30 weight percent, Germanate 5 to 40 weight percent, and Tellurite 2 to 40 weight percent) a network intermediator XO of 2 to 30 weight percent (Phosphate 5 to 30 weight percent, Germanate 5 to 30 weight percent, and Tellurite 2 to 30 weight percent); and co-doped with Erbium 0.5 to 5 weight percent and Ytterbium 5 to 30, and preferably greater than 15 weight percent, with a total doping concentration of greater than 5 and preferably greater than 10 weight percent.

In addition, the glass composition may be "alkaline-free" or may include additional network modifiers $R_2O$ selected from alkaline metal oxides such as $K_2O$, $Na_2O$, $Li_2O$, and $Rb_2O$. In fiber waveguides the glass composition may include a mixture of network modifiers, e.g. BaO and ZnO, such that the optical fiber has a temperature coefficient of refractive index from about $-2.0 \times 10^{-6}$ to $2.0 \times 10^{-6}$.

Figure 3A:
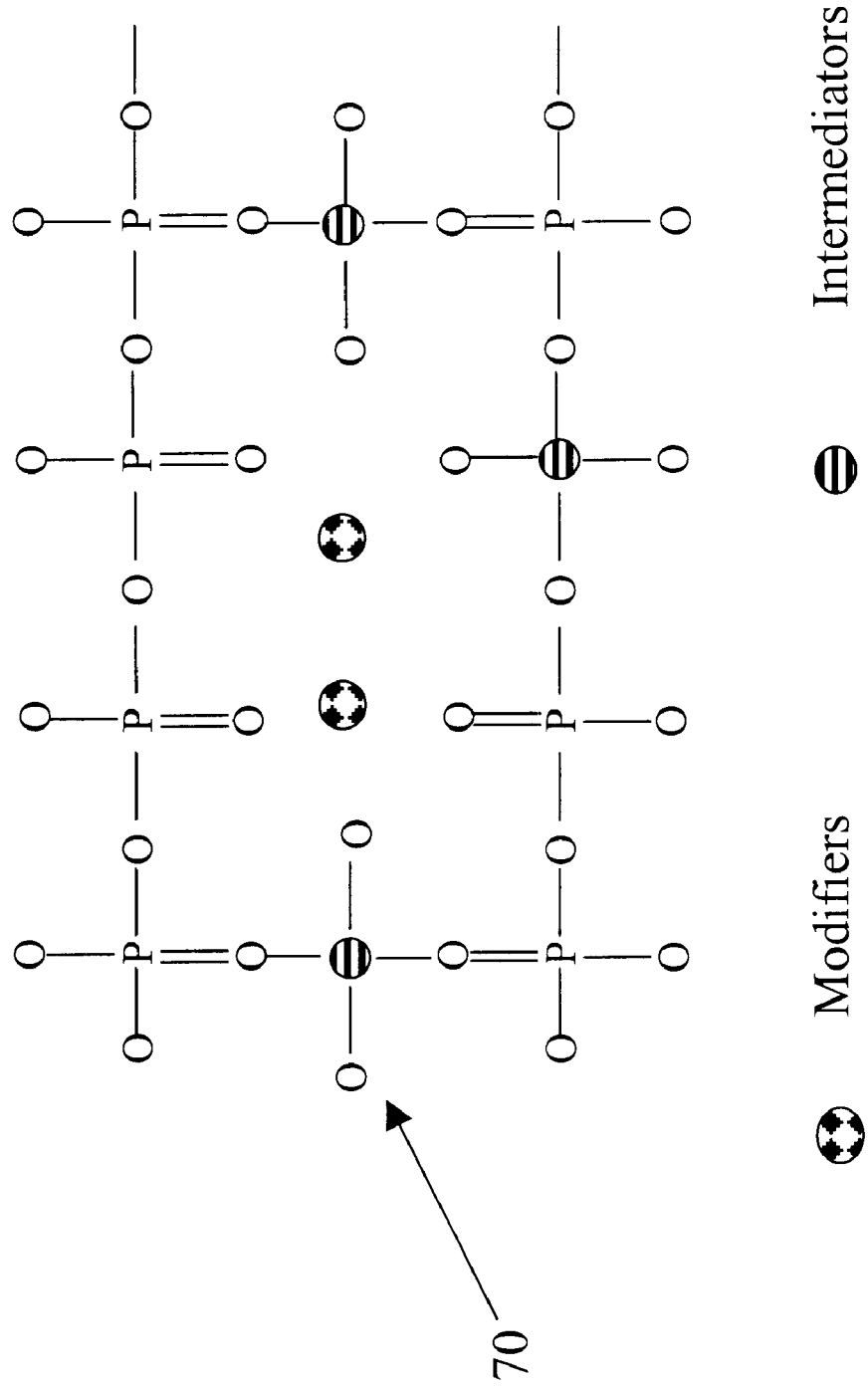
FIGS. 3a through 3c are diagrams of the glass networks for phosphate, germanate and tellurite, respectively.
Figure 3B:
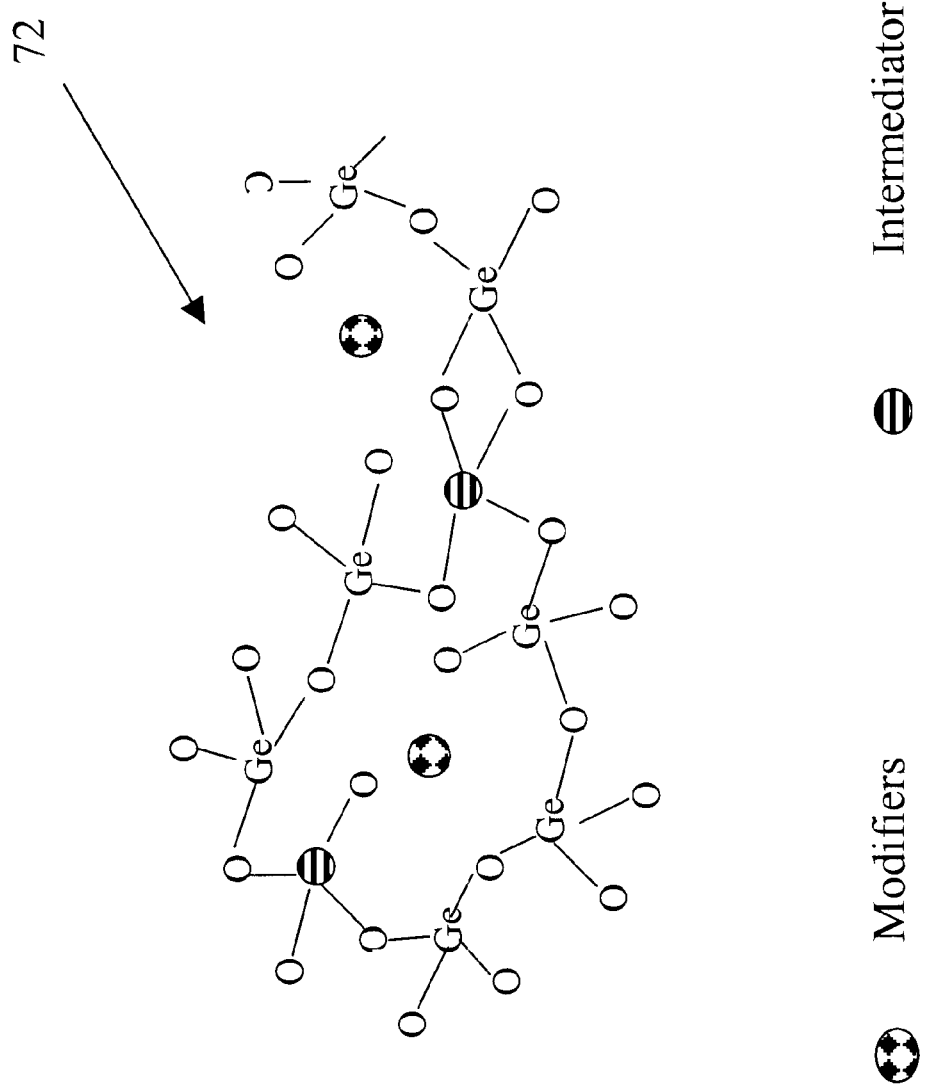
Figure 3C:
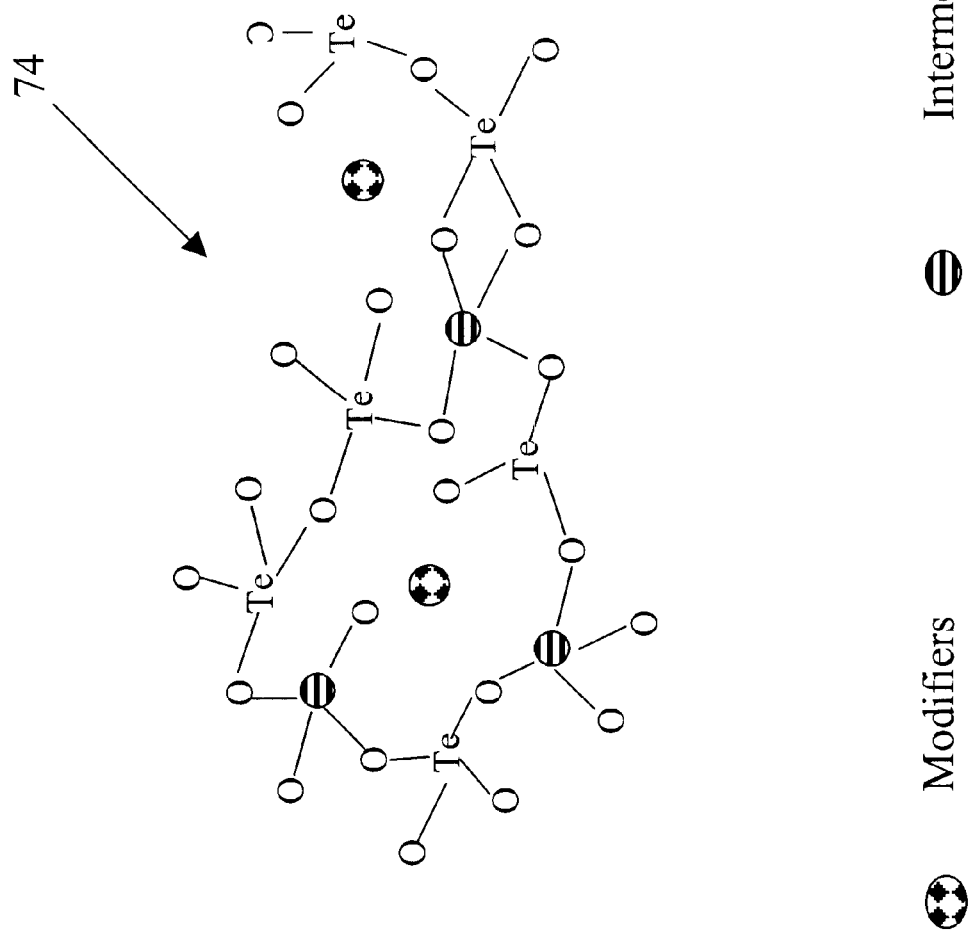

As shown in FIGS. 3a through 3c, the low temperature multi-component glasses phosphate, germanate and tellurite have a different bond structure than silica glass. In phosphate glass 70 as shown in FIG. 3a, the basic unit of structure is the $PO_4$ tetrahedron. Because phosphate (P) is a pentavalent ion, one oxygen from each tetrahedron remains non-bridging to satisfy charge neutrality of the tetrahedron. Therefore, the connections of $PO_4$ tetrahedrons are made only at three corners. In this respect, phosphate glass differs from silica-based glasses. Due to the large amount of non-bridging oxygen, the softening temperature of phosphate glasses is typically lower than silicate glasses. At the same time, the large amount of non-bridging oxygen in phosphate glass offers a great number of sites for rare-earth ions, which results in a high solubility of rare-earth ions. The modifier modifies the glass network, thereby reducing its melting temperature and creating even more sites for rare-earth ions. A uniform distribution of rare-earth ions in the glass is critical to obtain a high gain per unit length. The intermediator bridges some of the bonds in the network thereby increasing the network's strength and chemical durability without raising the melting temperature appreciably.

In one specific embodiment, a phosphate gain fiber for multi-mode clad-pumping comprises:
 a cladding that includes
  66.63% by weight $P_2O_5$,
  6.46% by weight $Al_2O_3$,
  23.42% by weight BaO,
  2.59% by weight $B_2O_3$, and
  0.9% by weight MgO and
 a core that includes
  55.21% by weight $P_2O_5$,
  5.36% by weight $Al_2O_3$,
  22.2% by weight BaO,
  0.99% by weight ZnO,
  3% by weight $Er_2O_3$, and
  15% by weight $Yb_2O_3$.

In germanate glass 72 as shown in FIG. 3b, the basic unit of structure is the $GeO_4$ tetrahedral. The coordination number of Ge changes from 4 to 6 when the addition of modifier increases. Due to the large size of Ge compared to Si, the bond strength of Ge—O is weaker than that of Si—O. So the melting temperature of germanate glasses typically is lower than silicate glasses.

In tellurite glass 74 as shown in FIG. 3c, the basic unit of structure is the $TeO_4$ tetrahedral. $TeO_2$ is a conditional glass network former. $TeO_2$ will not form glass on its own, but will do so when melted with one or more suitable oxides, such as PbO, $WO_3$, ZnO, $Al_2O_3$, $B_2O_3$, $Y_2O_3$, and $La_2O_3$. $Te^{4+}$ ion may occur in three, four or six coordinated structure, which depends on the detailed glass composition and the site of ion.

In addition, the glass composition may be "alkaline-free" or may include additional network modifiers $R_2O$ selected from alkaline metal oxides such as $K_2O$, $Na_2O$, $Li_2O$, and $Rb_2O$. In fiber waveguides the glass composition may include a mixture of network modifiers, e.g. BaO and ZnO, such that the optical fiber has a temperature coefficient of refractive index from about $-2.0\times10^{-6}$ to $2.0\times10^{-6}$.

Multi-Mode Pumping of Compact R-EDA

Multi-mode clad-pumping is used in place of conventional single-mode core-pumping because a) multi-mode pumps are much cheaper and easier to couple than single-mode pumps and b) the reflective scheme helps overcome the power conversion (pump absorption) limitation associated with the ultra-short high-gain waveguide. As was mentioned previously, the R-EDFAs described in the literature were single-mode core-pumped. Over 80% of the pump energy was absorbed in the meters of spooled fiber leaving very little motivation to recycle the pump. Similarly, multi-mode clad-pumped EDFAs that use meters of spooled silica fiber would absorb about 70% of the pump energy. In comparison, the ultra-short multi-component glass waveguide of the present invention absorbs less than 60% and probably about 30% of the multi-mode pump energy due to its short length. This is a very inefficient use of the pump energy, hence an ideal candidate for pump recycling. Further, the high absorption coefficients that characterize the glass core create a mode profile that looks like a donut. In order to further enhance absorption of the reflected pump signal by the core, in certain embodiments the pump reflector is configured to scramble the higher order modes of the propagating pump signal. Otherwise the pump remains substantially in the inner cladding and is not absorbed by the core.

Fused-Fiber Coupled R-EDA

Figure 4A:
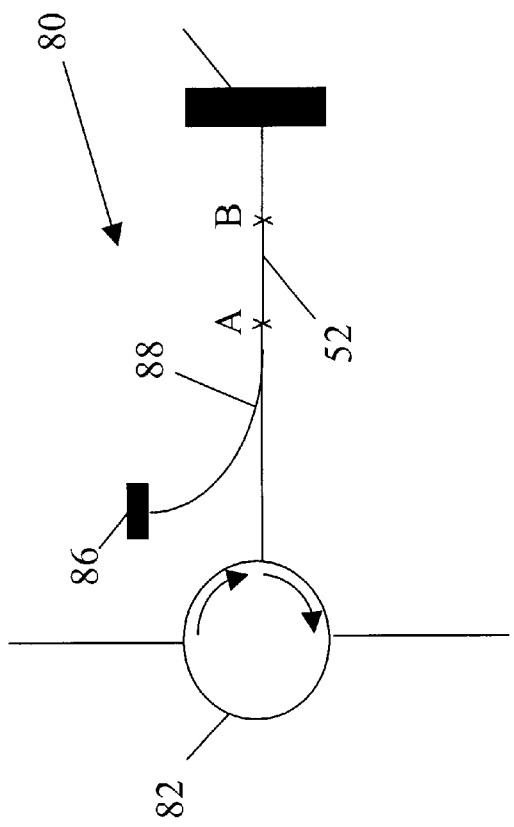
FIGS. 4a–4b illustrate the R-EDA of FIG. 2 with a fused-fiber coupler and its pump profile.
Figure 4B:
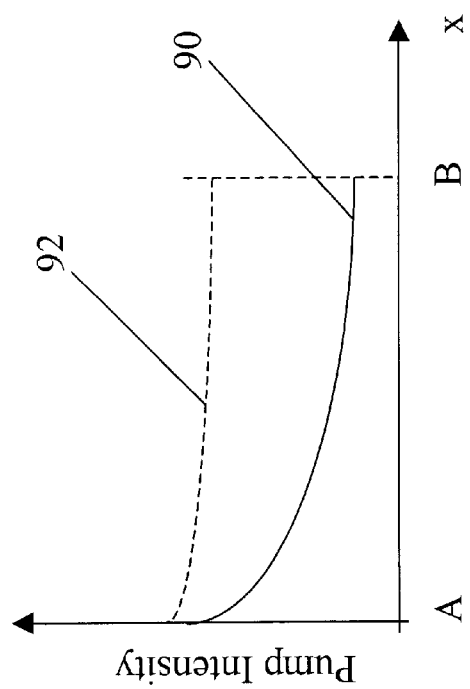

FIGS. 4a–4b illustrate an R-EDA 80 comprising a waveguide 52 (depicted as an optic fiber) between the I/O port of circulator 82, a reflector 84, a multi-mode pump 86 and a fused-fiber coupler 88 that couple pump light into waveguide 52. U.S. Pat. No. 5,999,673 entitled "Coupling arrangement between a multi-mode light source and an optical fiber through an intermediate optical fiber length" describes a multimode/single mode wavelength-division multiplexing (MM-SM WDM) coupler as consisting of two optical fibers—one is a multimode fiber and the other is a double clad fiber—that are joined together in one region resulting in a coupler with 2 input and 2 output fibers. The coupler is manufactured based on a method in which two optical fibers are fused and elongated into a coupler by using a heat source. Another term for this type of coupler is biconical taper fiber coupler.

The MM-SM WDM coupler is designed to couple multimode pump light, typically centered at 980 nm having a bandwidth of 3 nm, into a double clad fiber with single mode signal, typically at 1550 nm, propagating in the core region of the double clad fiber. In this structure, the signal light propagates through the fusion region unperturbed—with little or no loss. Because the multimode core is fused with the inner clad of the double clad fiber, pump light is transferred into the inner clad. This results in pump light propagating in the inner clad of the double clad output fiber along with the signal that is confined in the core region. This double clad fiber is spliced to the optic fiber 52.

The fused-fiber coupler is an all fiber solution based on an established low-cost technology. However, the coupling efficiency strongly depends on the mode launched in the pump port with results ranging from 90 percent to 25 percent. The length of the coupler is relatively long (7–10 cm) which requires fiber management for amplifier amplifications.

In a single pass of pump multimode geometry, in which reflector 84 (a mirror, grating, part of a gain flattening filter (GFF) or a faraday rotating mirror) reflects only the signal wavelengths, the absorbed pump, as shown in pump profile 90 in FIG. 4b, is larger on the side of the fiber closest to pump 86 and lowest on the side of the fiber furthest away from the pump. pumping from the input/output side produces the best noise figure whereas pumping from the reflective side optimize gain.

Although the specific shape of the absorbed power depends on the fiber geometry, experimentation has revealed two distinct regimes. In the first few mm (5–15), the pump is strongly absorbed (exponential with distance)—depleting the central modes overlapping with the core. Beyond this first region, the pump in the core is depleted, but the pump from the cladding is channeled into the core via mode scrambling due to intrinsic perturbation in the fiber. This results in pump absorption in the core, but less efficiently than in the previous case (more linear with distance).

In a double pass geometry, in which reflector 84 reflects both the signal and pump wavelengths, the un-absorbed pump is available for absorption on a second pass through the fiber 52. The absorbed pump will increase the inversion rate on the side furthest from the pump—generally making the absorbed profile 92 more spatially uniform, and the noise figure better. The absorbed pump will follow the linear-with-distance absorption rate on the return pass, unless the pump mode is scrambled to move energy into the central core—and enabling an exponential rate with distance over a few mm of propagation (see FIGS. 11a and 11b for details). Depending upon the amount of pump power remaining after the second pass the pump may or may not need to be dumped. If so an un-buffered SMF fiber with index matching material can be inserted between the circulator and gain fiber and bent to out-couple residual pump.

Double-pass reflector 84 can be implemented in a number of ways. The simplest is to coat the end of the double clad fiber with a broadband metal or dielectric coating. If we use a dielectric coating there will be difficulty in getting both high reflectivity for signal AND high reflectivity for pump. If we use metal coating on fiber facet, we sacrifice some loss for both signal and pump but get an inexpensive solution. A more complicated approach, places a pump reflector (hemisphere pump recycler or fiber grating reflector written in the inner clad) that does not perturb signal in series with a signal reflector. This has the advantage of allowing higher reflectivity for pump recycling because the grating or hemisphere can be optimized for that function alone. It also allows for a GFF and signal reflector to be made in dielectric coating without requiring pump reflection. The difficulty is that cladding mode pump reflectors are not standard components.

In general, double passing both pump and signal enhances performance but not without complications. Both the signal and ASE will build up on the return pass—which produces more signal gain (good), but perhaps more noise since the highest power signal is overlapping the region where the signal is input. If the signal plus ASE is too high, the inversion in that region will be depleted and degrade the noise figure of the amplifier overall. However, This complication is less severe for the ultra-short mid-gain amplifiers Compared with traditional high gain (>20 dB) amplifiers.

TIR Coupled R-EDA

Figure 5A:
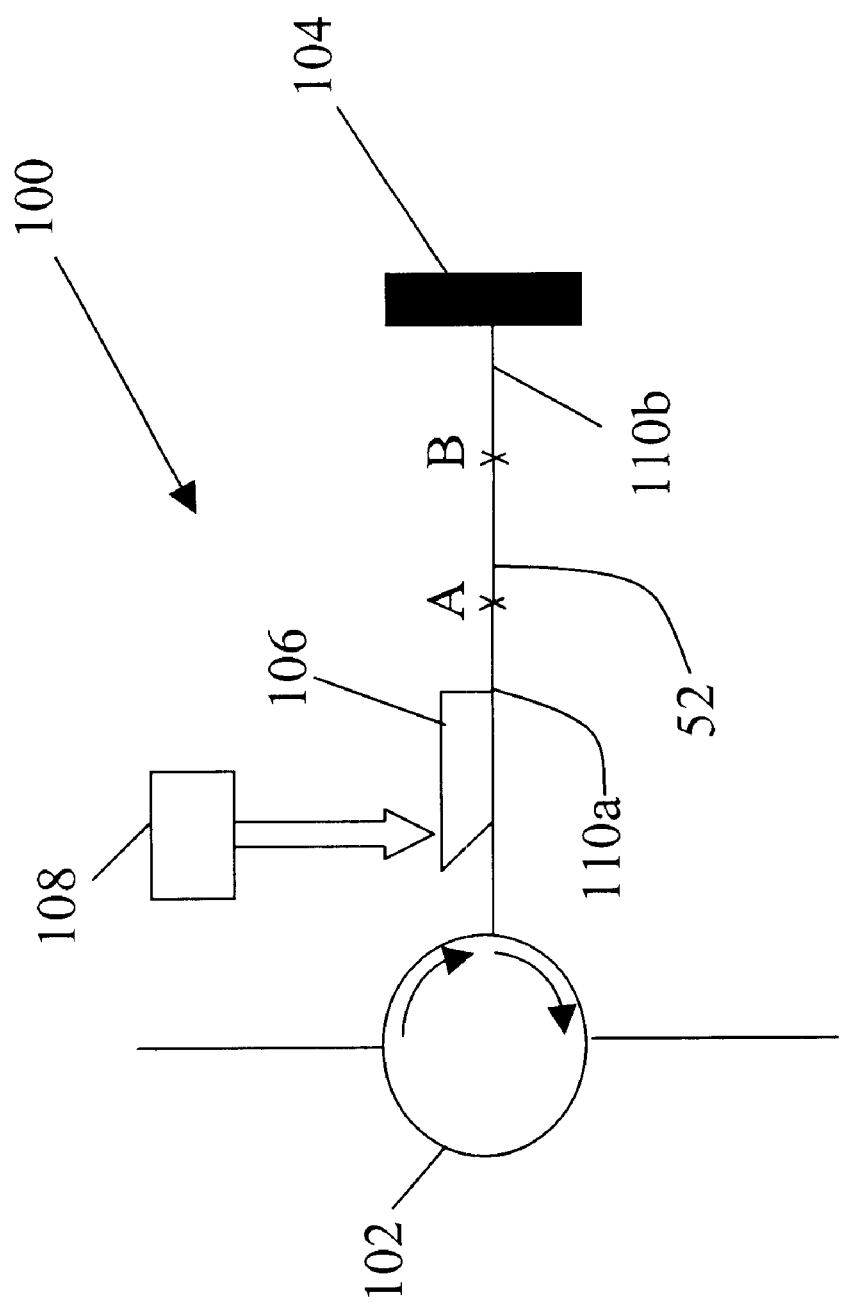
FIGS. 5a–5b illustrate the R-EDA of FIG. 2 with a TIR coupler and an enlarged view of the TIR coupler.
Figure 5B:
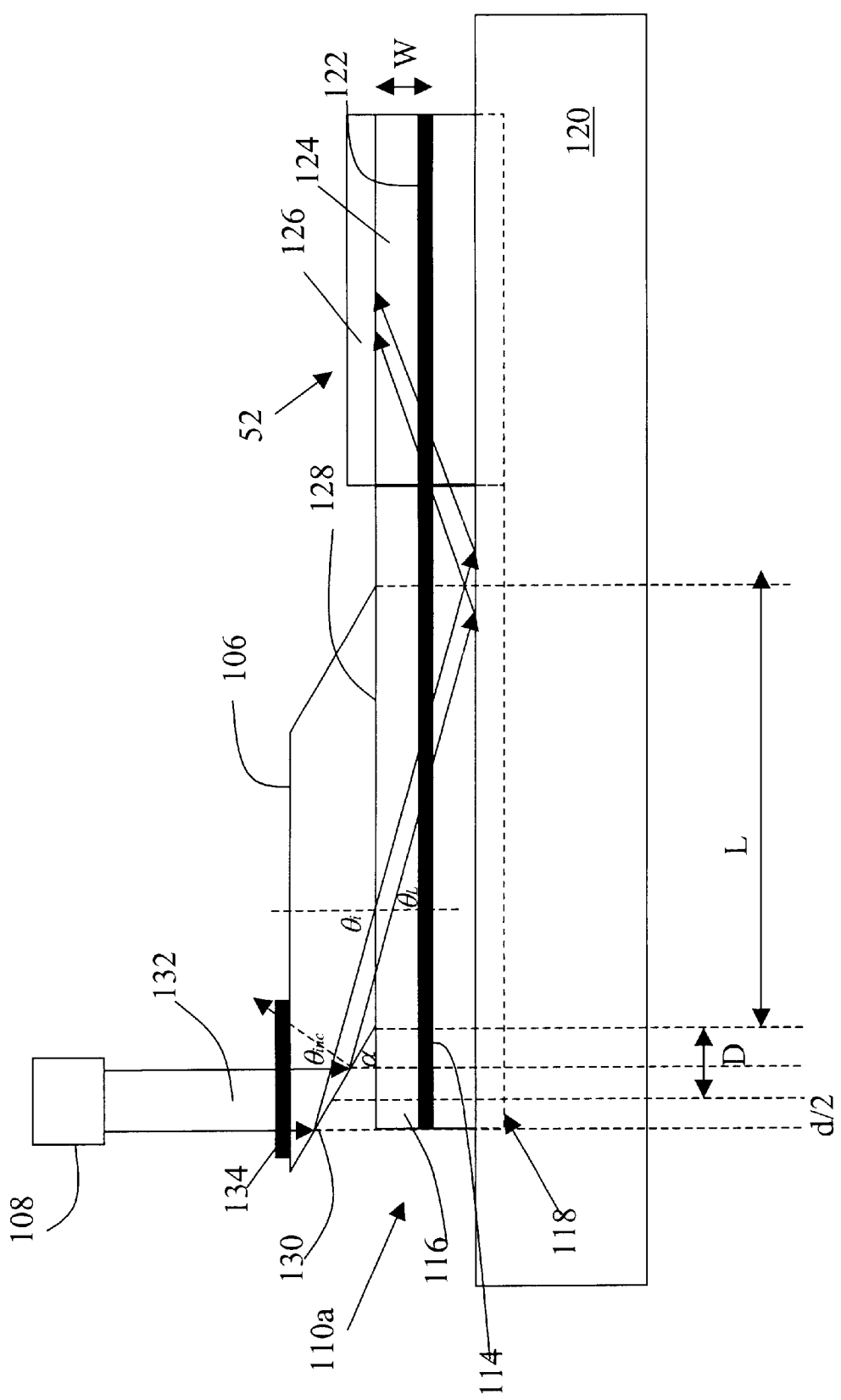

FIGS. 5a–5b illustrate an R-EDA 100 comprising a waveguide 52 (depicted as an optic fiber) between the I/O port of circulator 102 and reflector 104 and TIR coupler 106 that couples pump light from multi-mode pump 108 into active double-clad fiber 52, which is fusion spliced between segments 110a and 110b of passive double-clad fiber, which can be formed from silica or the same multi-component glass as the active fiber. The pump intensity profile is the same as that for the fused-fiber coupler. The TIR coupler is compact and can provide coupling efficiencies approaching 90%. As described in co-pending U.S. patent application Ser. No. 09/943,257 entitled "Total Internal Reflection (TIR) Coupler and Method for Side-Coupling Pump Light into a Fiber", which is hereby incorporated by reference, efficient coupling is accomplished by bonding a TIR coupler in optical contact to the fiber's inner cladding; either the active or passive double-clad fiber. The inner cladding, which surrounds a core, has at least one flat surface and is transparent to the pump wavelength. The pump directs light into the TIR coupler from either the front or backside of the fiber, which is mounted on a substrate. The beam is preferably oriented substantially normal to the fiber to simplify packaging, facilitate the use of a multi-mode pump and simplify the design of any anti-reflection (AR) coatings.

The TIR coupler has an angle of taper a and a length L such the principal ray of the pump light is reflected at an angle that satisfies the total internal reflection (TIR) condition at the coupler's reflecting surface, and input and output coupling conditions, to efficiently "fold" the light into the fiber and satisfies the TIR condition inside the fiber to "guide" the light down the fiber's inner cladding. The angle of incidence is preferably such that substantially all of the pump light (principal and marginal rays) satisfies the TIR condition. The pump light is preferably focused to obtain such high coupling efficiencies and to confine the light within a narrow cladding, which produces higher power density.

As shown in FIG. 5b, a "passive coupler" 112 includes a TIR coupler 106 mounted on passive double-clad fiber 110a, which is optically coupled to active fiber 52. Double-clad fiber 110a comprises an undoped core 114, an inner cladding 116 and a partial outer cladding 118 and is mounted on a substrate 120. Active fiber 52 comprises a doped core 122, an inner cladding 124 and an outer cladding 126 and is also mounted on substrate 120. TIR coupler 106 is bonded in optical contact to a flat surface 128 on the passive fiber's inner cladding 116 for length L.

TIR coupler 106 has a reflecting surface 130 that forms an exterior angle of taper α with respect to surface 128. In this example, and as will typically be the case, the cores and inner claddings of the passive and active fibers are substantially matched in both refractive index and cross-section. Pump source 108 is positioned on the front side of substrate 120 so that a beam of pump light 132 having finite width d is substantially normal to the fiber. Pump light 132 passes through AR coating 134, reflects off surface 130 and is folded into passive fiber 110a, which in turn guides the pump light into active fiber 52 thereby exciting the entire length of doped core 122 in the active fiber. Assuming a substantially collimated beam and index-matched fibers, the constraint equations for the passive coupler shown in FIG. 5b are given by:

$$\frac{\pi - \theta_i}{2} > \arcsin\left(\frac{1}{n_{coupler}}\right) \quad (1)$$

$$\theta_L > \arcsin\left(\frac{n_{ext}}{n_{clad}}\right) \quad (2)$$

$$\frac{(|D| + d/2)}{\cos\theta_i} < L < \frac{(|D| - d/2)}{\cos\theta_i} + 2W\tan\theta_L \quad (3)$$

$$d_{max} = 2W \tan\theta_L \cos\theta_i \quad (4)$$

where $n_{coupler}$ is the refractive index of the coupler and the surrounding media is air;

$n_{clad}$ is the refractive index of the fibers' inner cladding, $n_{ext}$ is the refractive index of the active fiber's outer cladding;

W is the diameter of the active fiber's inner cladding;

|D| is the lateral distance from the starting point of the taper to the point where the beam of pump light strikes the reflecting surface as projected onto the fiber where |●| is the absolute value operation;

$d_{max}$ is the maximum beam diameter for d;

$\theta_i$ is the angle of incidence at the coupler-fiber interface and is dictated by the geometry of the taper and the angle of incidence $\theta_{inc}$ at the air-coupler interface;

$\theta_{inc}$ is the angle of incidence of the pump light with respect to the reflecting surface, e.g. the angle measured from the normal to the reflecting surface to principal ray of the incident light, $\theta_{inc}$ is equal to $(\pi-\theta_i)/2$ for a pump source that is oriented normal to the fiber; and $\theta_L$ is the launch angle of the pump light into the fiber, which in many cases where the coupler and inner cladding are index matched, the launch and incidence angles at the coupler-fiber interface are the same.

Side-Pumped R-EDA

FIGS. 6a–6b illustrate an R-EDA 140 comprising a waveguide 52 (depicted as a planar waveguide) that is optically coupled to the I/O port of circulator 142 and formed with a reflector 144, which is reflective to at least the signal wavelength. Planar waveguide 52 includes an active core 146 embedded in an inner cladding layer 148 surrounded by a pair of outer cladding layers 150 (air or a compatible material with a lower index). A multi-mode pump 152 injects light into the inner cladding layer 148, which is substantially transparent to the pump wavelength, so that the pump light moves in a transverse direction with respect to the longitudinal orientation of the active core. The inner cladding layer serves both to confine the optical signal inside the active core and to guide the pump light. The sides of the inner cladding layer are reflective to the pump wavelength so that the pump light is recycled and illuminates multiple segments of the active core as the pump light bounces back-and-forth and moves longitudinally down the waveguide producing a uniform pump intensity 154 as shown in FIG. 6b. The illumination of the active core element causes stimulated emission, hence amplifying the optical signals passing through the active core element. As will be described in detail with reference to FIGS. 13 and 14, the side-pumped R-EDA is most attractive when used to pump an amplifier array.

End-Pumped R-EDA

FIGS. 7a–7b illustrate an R-EDA 160 comprising a waveguide 52 (depicted as an optic fiber), which is fusion spliced between segments 162 and 164 of passive double-clad fiber that are respectively coupled to the I/O port of circulator 166 and a reflector 168, which is configured to reflect light at the signal wavelength and transmit light at the pump wavelength, e.g. a wavelength selective grating written on the fiber core. Pump light is coupled into waveguide 52 through reflector 168 using the well known process of fiber pig-tailing a multi-mode pump 170 using a lens 172 to focus pump light into the inner clad of the double clad fiber. This is the simplest process for coupling the pump into the waveguide and can yield high coupling efficiency (>85%). The drawbacks to this approach are a) pigtailing terminates the open end of the amplifier so that other optical components (See FIG. 12) cannot be integrated, b) As mentioned before, pumping from the reflective side degrades the noise figure, and c) in a double-pass configuration, although the inversion profile 176 can be made more uniform, pump recycling becomes more challenging requiring the use of an inner clad grating, a hemispherical pump recycler, or reflective coatings inside the circulator as illustrated in FIGS. 8a–8c.

As shown in FIG. 8a, a grating 180 is written onto the inner cladding layer of double-clad fiber 162 to reflect multimode pump light. This approach provides an all-fiber solution that can be fusion spliced to any part of the amplifier chain requiring pump recycling. However, writing a grating on the inner cladding material is a non-standard process that requires a photosensitive inner cladding. This can be achieved with boron doping of the inner clad glass material. The grating needs to reflect a wide distribution of modes, which may be difficult to achieve over a broad range of pump wavelengths (30 nm).

As shown in FIG. 8b, a curved prism (hemisphere) 182 outcouples pump light from the inner cladding of the DC fiber 162 into the coated hemisphere. The rays are reflected at the surface of the hemisphere and returned to the inner clad of the fiber propagating in the opposite direction. This process does not interfere with signal, which is propagating in the fiber core. In principle the hemispheric prism can achieve high pump recycling efficiency without sacrificing signal loss. The difficulty of this approach lies in bonding the prism to the fiber to satisfy long-term reliability requirements.

Figure 8C:
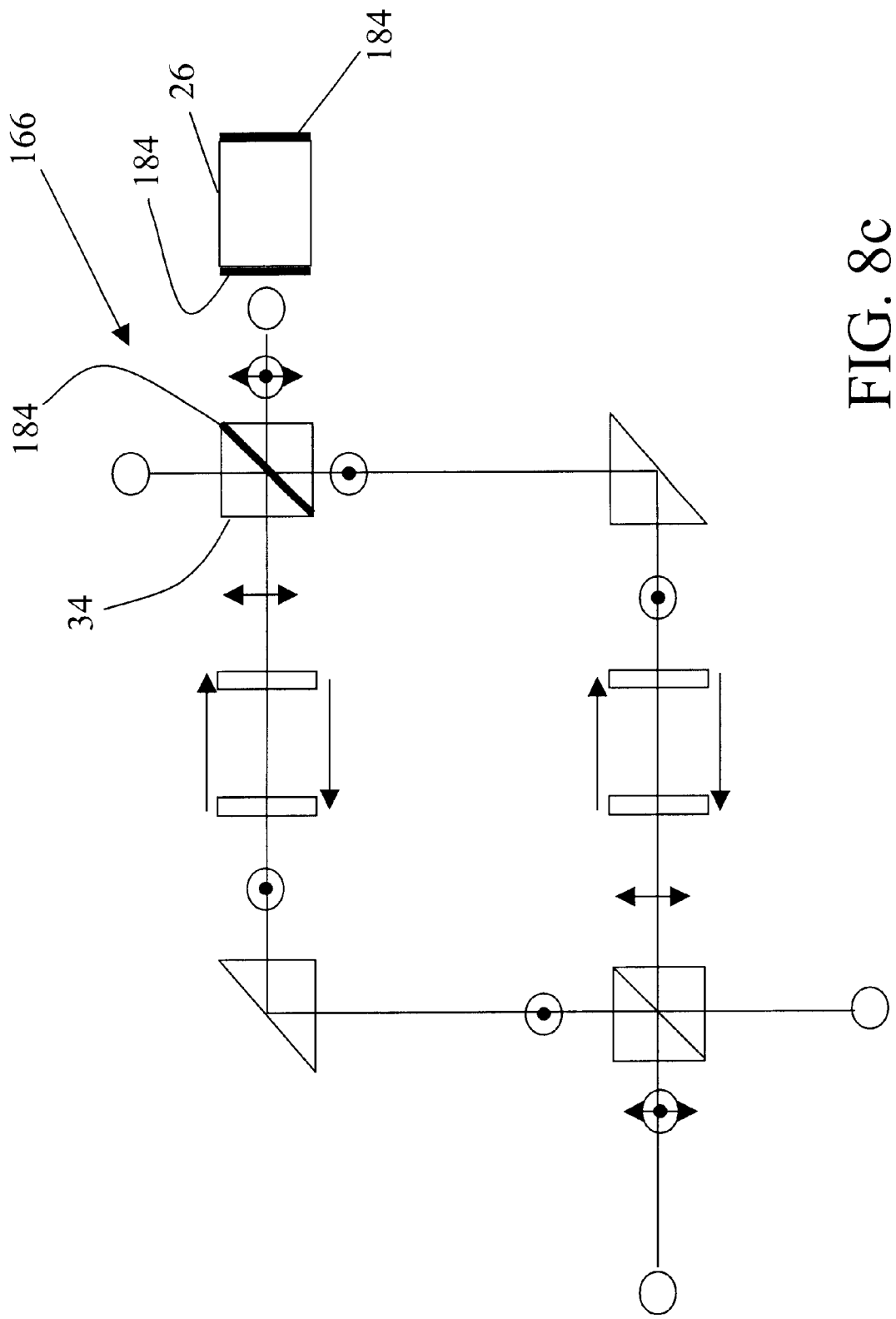

As shown in FIG. 8c, one or more elements of circulator 166 may be formed with a dielectric coating 184 to reflect the pump light. More specifically, either face of collimating lens 26 or the angled surface of polarizer prism 34 may be formed with an appropriate dielectric coating.

Circulator-Coupled R-EDA

Figure 1B:
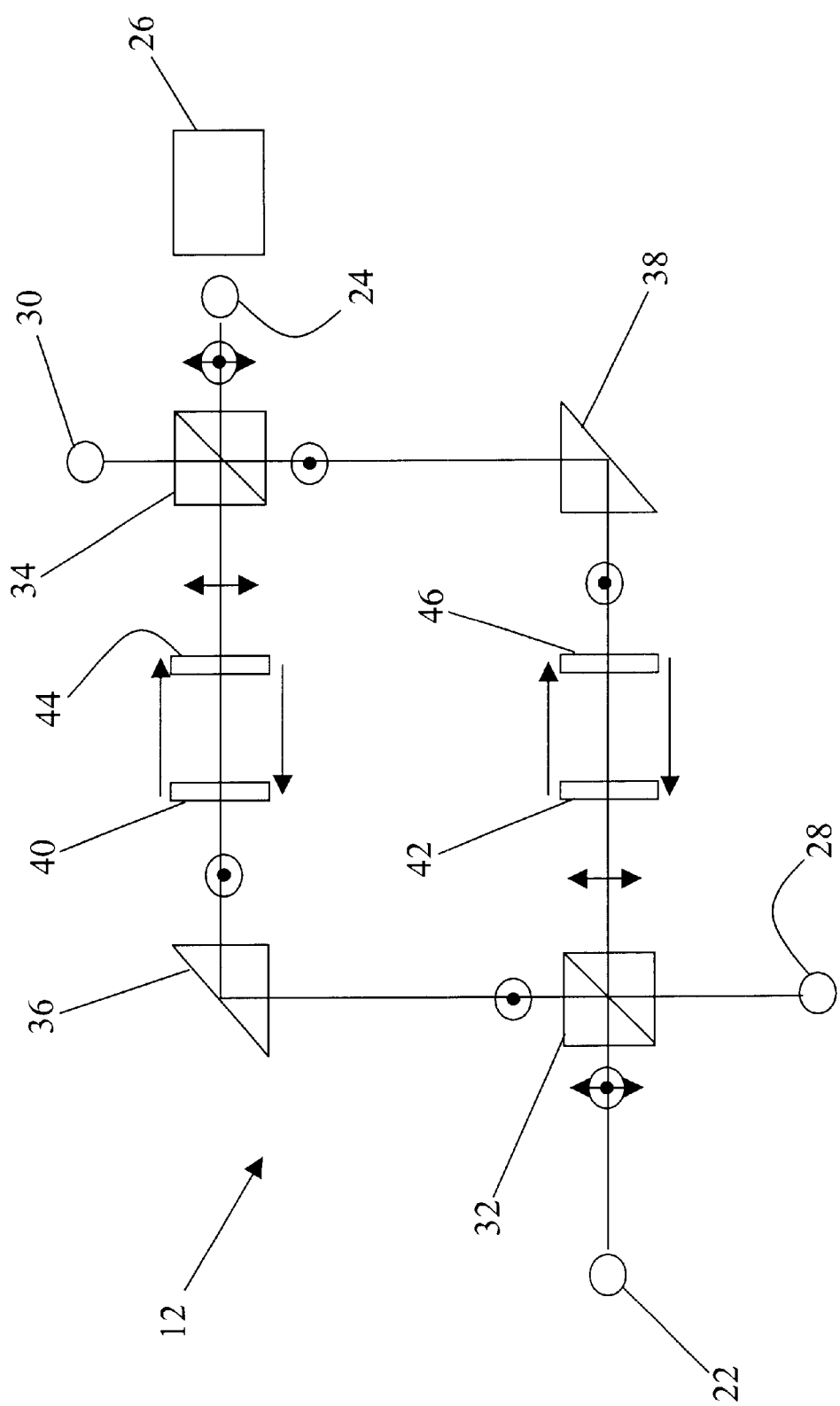
Figure 9A:
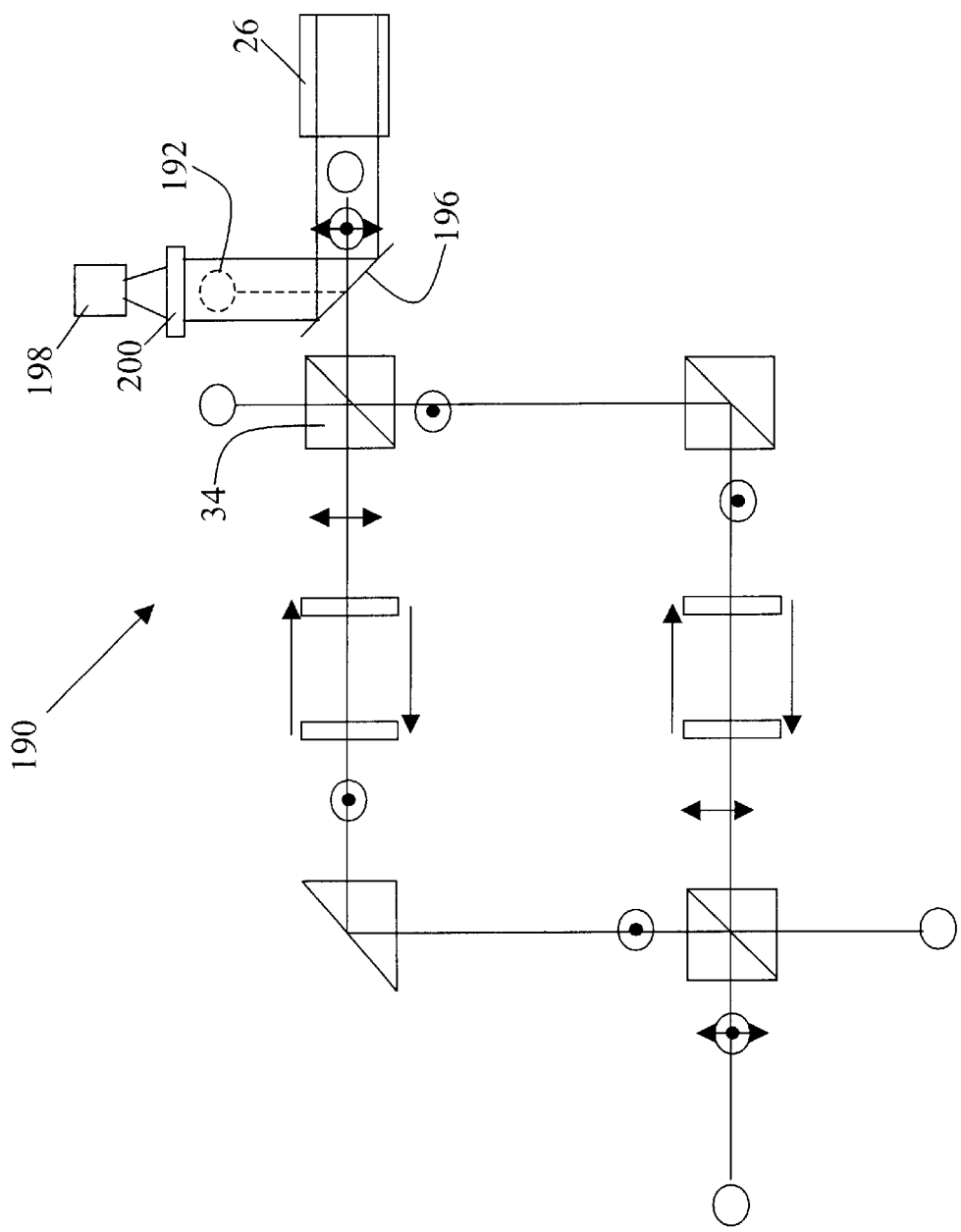
FIGS. 9a–9b illustrate two different schemes for using a modified circulator to couple both the signal and pump.
Figure 9B:
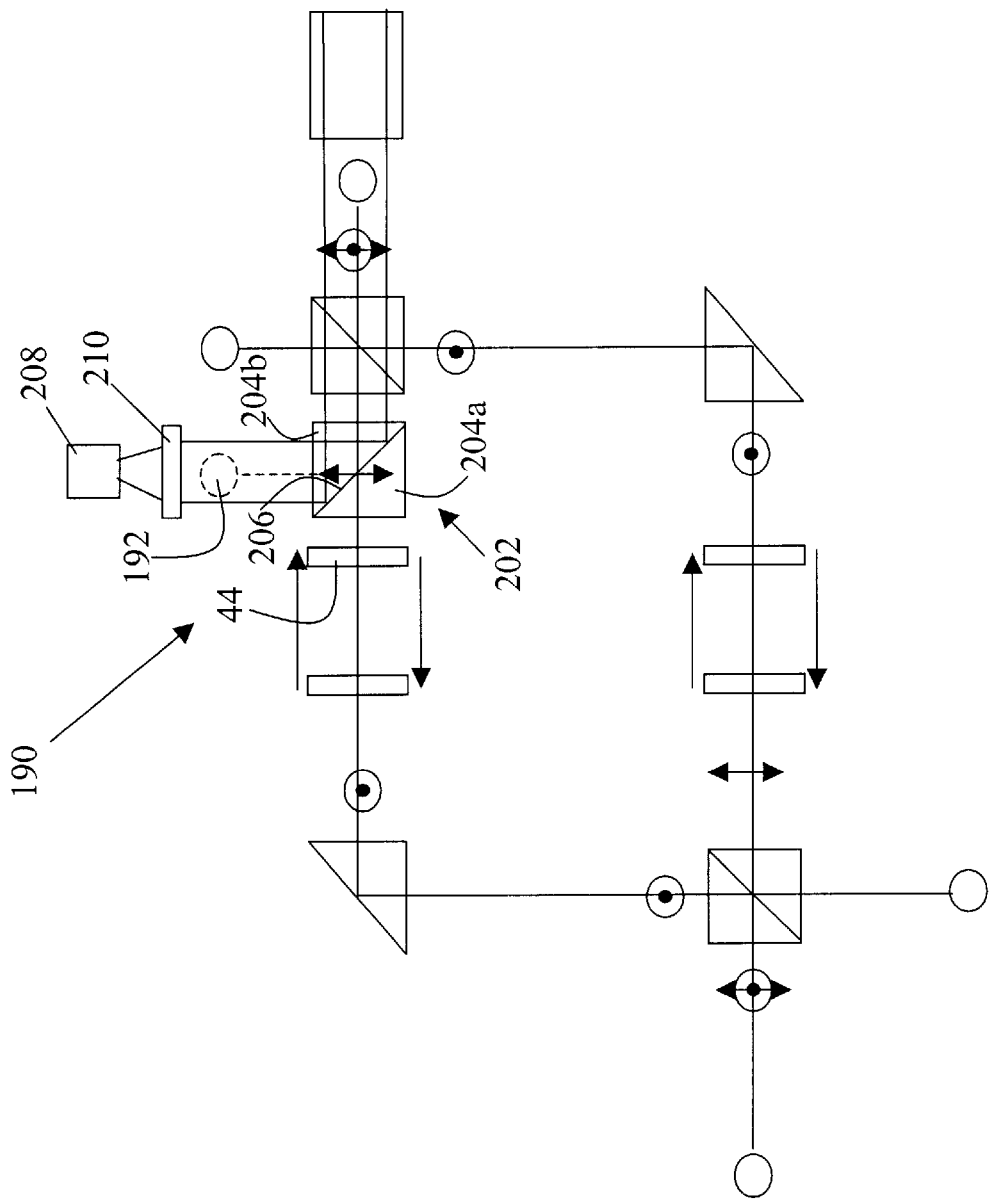

FIGS. 9a–9b and 10a–10b illustrate alternate embodiment of an R-EDA 190 in which the conventional 3-port circulator shown in FIG. 1b is modified to include an additional pump port 192 and an optical element to couple the multi-mode pump light into the optical path of the optical signal inside the circulator. The modifications depicted in FIGS. 9a–9b are at the schematic level and may be implemented in a number of ways depending upon the specific configuration of elements in a particular circulator. As shown in FIG. 9a, a mirror 196 is placed in the optical path between polarizer prism 34 and collimating lens 26 at a 45° angle. A multi-mode pump 198 and collimating lens 200 are arranged substantially normal to the optical path so that the pump light is reflected off of mirror 196 into the optical path. As shown in FIG. 9b, a beam combiner 202 is placed in the optical path between optically active element 44 and polarizer prism 34. Beam combiner 202 comprises two pieces of complementary glass 204a and 204b bonded together at a mirrored surface 206, which is substantially transmissive to the optical signal, approximately 1.5 um wavelength, and substantially transmissive to the pump light, approximately 980 nm wavelength. A multimode pump 208 and collimating lens 210 are arranged substantially normal to the optical path so that the pump light is reflected off of mirrored surface 206 into the optical path.

Figure 10A:
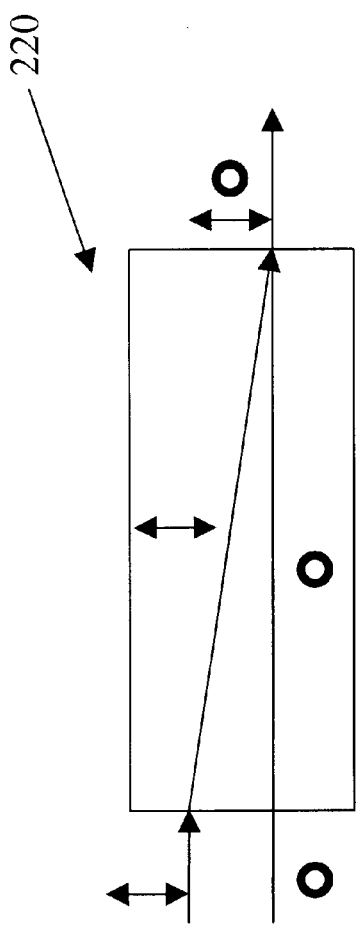
FIGS. 10a–10b illustrate a birefringent crystal from a known circulator and a modification to that birefringent crystal in accordance with the invention as shown in FIG. 9b to couple the pump.
Figure 10B:
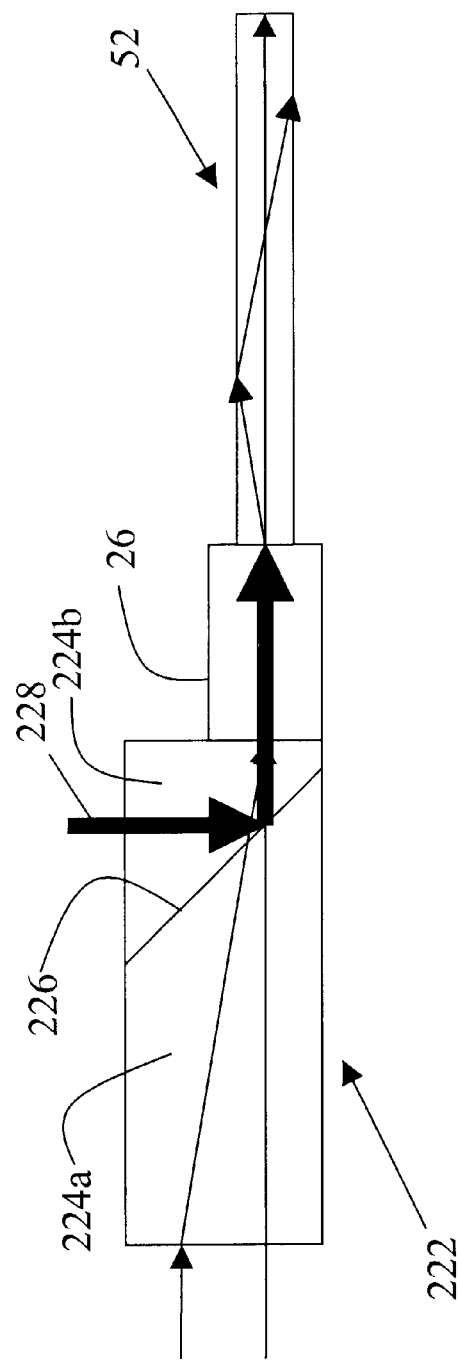

The birefringent crystal 220 depicted in FIG. 10a is typical of many circulators (see for example third birefringent material 122 in U.S. Pat. No. 6,178,044) and can be modified to form birefringent crystal 222 as shown in FIG. 10b to couple multi-mode pump light. FIG. 10a schematically describes the way the birefringent material splits/combines the 2 polarization beams. The birefringence of the material has its optic axis within the plane of the paper.

The ordinary ray, which is often called o-ray, is polarized perpendicular to the optical axis of the crystal and does not change direction in the crystal because E vector and D vector are parallel. The extraordinary ray, e-ray, is polarized orthogonally to the o-ray and has a different direction of propagation within the crystal because the E vector and D vector are not parallel. The difference in the angle is a function of the material property and the orientation of the optical axis, and is typically a few degrees. The E and D vectors have the same direction of wave normal, so after the ray exits the crystal, they propagate in the same direction. (Here the rays are assumed to incident onto the crystal at normal angle, which is a good assumption/approximation.) The result is the polarization splitter/combiner by the amount that is determines by the orientation of the optical axis, material property, and thickness of the crystal. The popular materials for this purpose include lithium niobate, yttrium orthovanadate, and potassium titanyl phosphate.

As shown in FIG. 10b, pump coupling is integrated into birefringent crystal 222 by cutting the crystal into two pieces 224a and 224b, coating the interface 226 with an optical coating that is substantially transmitting to the optical signal and substantially reflective to the pump signal and bonding the two pieces together. The optical coating consists of a stack of dielectric layers that is reflective at the pump wavelength, e.g. 980 nm, and substantially transmitting at the signal wavelength, e.g. 1550 nm. The stack is formed by alternating layers of low and high index materials. Pump light 228 is injected orthogonal to the optical axis of the crystal and reflects off the interface into the optical path such that at the I/O port 24 the optical signal is coupled into the waveguide core and the pump light is coupled into the waveguide inner cladding.

Mode Scrambling of Reflected Pump

Reflecting the pump energy for a second pass through the gain media can improve the pump intensity profile by increasing or making more uniform the inversion level or alternately be reducing the required pump power. However, to have any beneficial effect the reflected pump energy must be absorbed into the core. For a gaussian pump beam, modeling shows that pump absorption is very high in the first 5–15 mm of the fiber in which the central modes that overlap directly with the core are rapidly depleted due to the high ytterbium concentrations. Once the central mode is depleted the absorption rate slows down considerably. In a perfect fiber, further absorption would be relegated to the tails of higher order gaussian beams. However, real waveguides and fibers have intrinsic properties such as variations in the refractive index, bends, strain, imperfections in the cladding, etc. that perturb or scramble the modes causing them to be coupled into the core region. Nevertheless, depletion of the core modes is dominate and the shape of the pump intensity after propagation through the waveguide resembles a donut—core is fully absorbed. To further enhance mode scrambling for the return pass, the reflector can be designed to redirect modes from the inner cladding into the core.

Figure 11A:
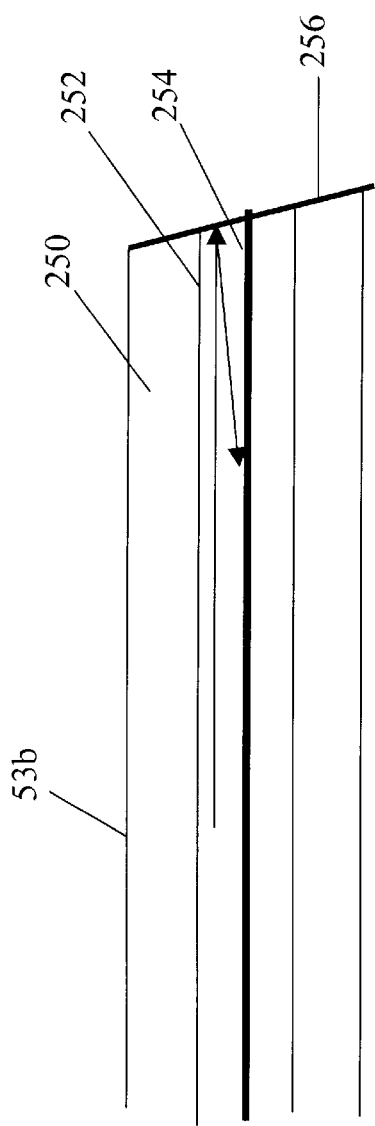
FIGS. 11a and 11b illustrate two different schemes for mode scrambling the pump.
Figure 11B:
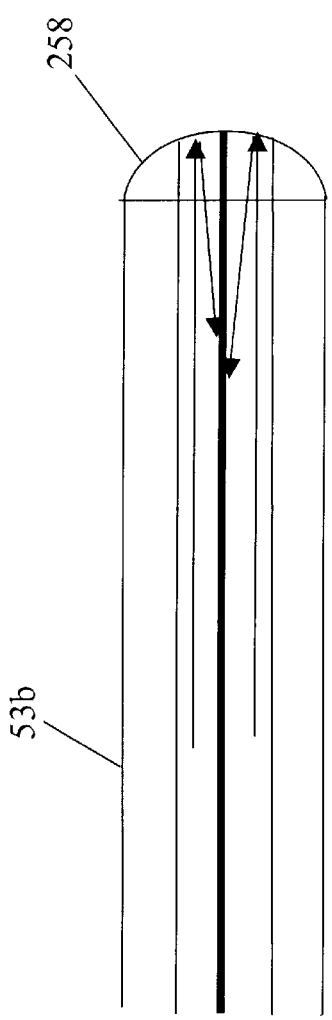

As shown in FIGS. 11a and 11b, the reflector formed on double clad fiber 53b (as shown in FIG. 2) can be tilted or formed with curvature to direct the higher order modes confined by outer cladding layer 250 to propagate in inner cladding 252 back into the core 254. Specifically, double clad fiber 53b can be cleaved at an angle and coated to form a tilted reflector 256 (FIG. 11a) or polished and coated to form a hemispheric reflector 258 (FIG. 11b). Furthermore, in the end-coupled scheme shown in FIG. 8, the hemispheric and clad grating reflectors will also scramble the reflected higher order modes. In the ultra-short lengths contemplated by the invention, length cannot be used to effectively absorb the pump so mode scrambling is particularly important.

Integration of Optical Components in Compact R-EDA

Figure 12:
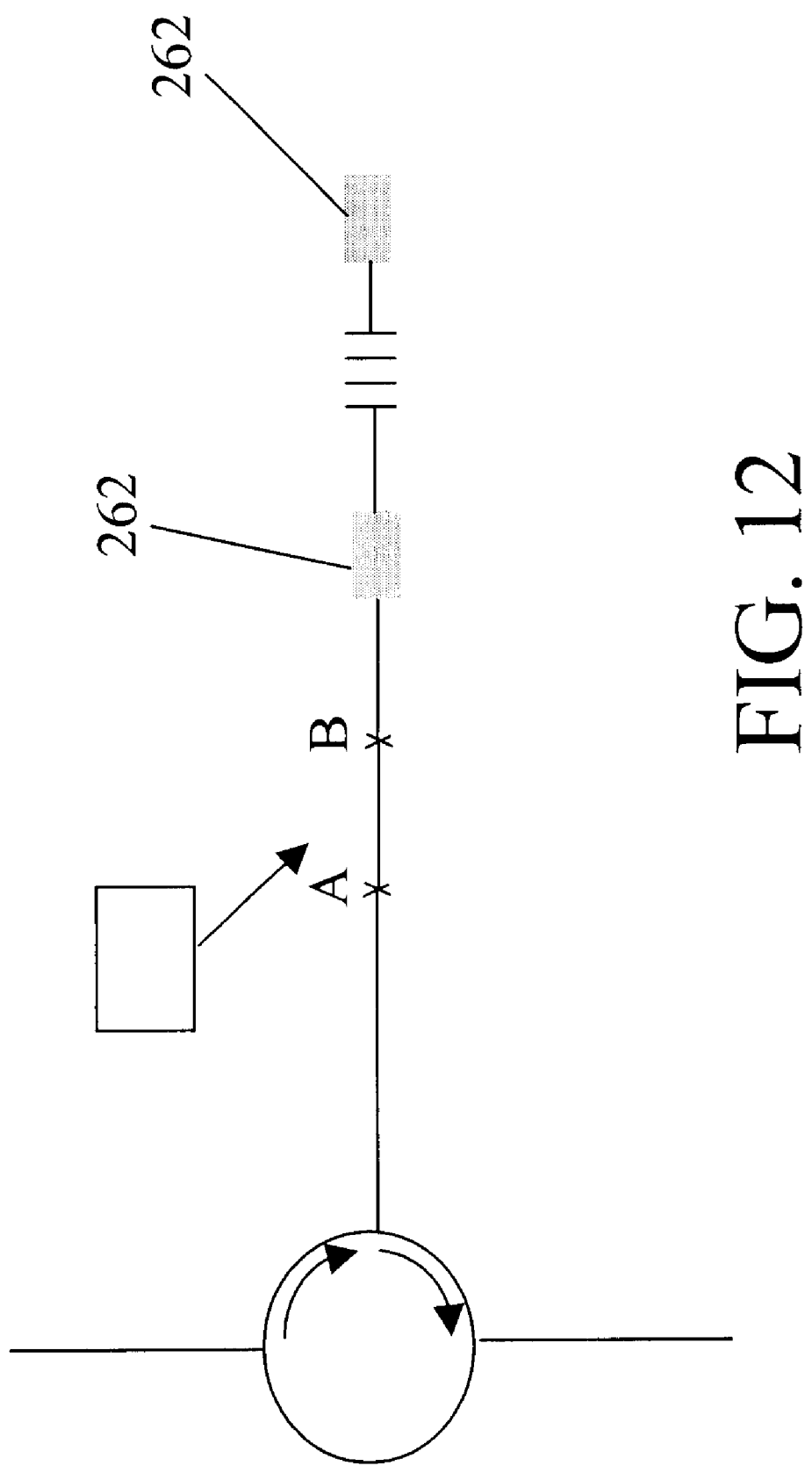
FIG. 12 is a schematic of an R-EDA that integrates one or more reflective optical components.

The R-EDA architecture allows for the easy integration of reflective optical components and in most configurations provides an open port for integration of other optical components or functionality. As shown in FIG. 12, a reflective optical component 260 and an optical component 262 have been integrated on either side of reflector 56 for the R-EDA shown in FIG. 2. Reflector 56 comprises one or more wavelength selective gratings that reflect at least the signal wavelength and possibly the pump wavelength. A portion of the signal and/or pump is transmitted through the gratings to optical component 262. Reflective optical component 260 may comprise one or more components including: gain flattening filters, dispersion compensators, ASE filters and variable optical attenuators. Note, in some cases the function of reflecting the signal may be integrated with the optical component. Optical component 262 may comprise a monitoring device for signal power, signal dispersion and/or ASE power.

Compact R-EDA Arrays

Figure 13:
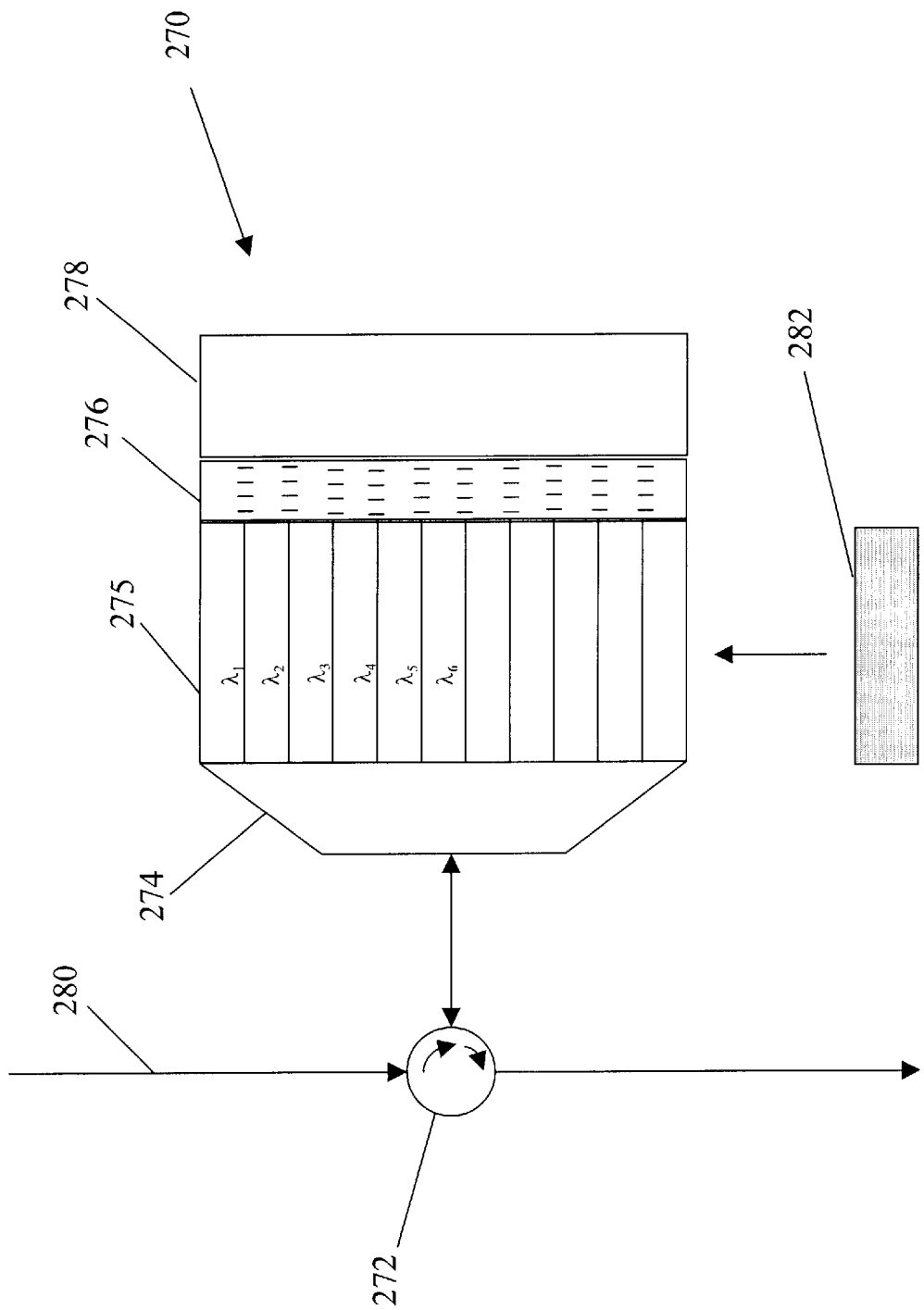
FIG. 13 is a schematic of a R-EDFA array.

The R-EDA architecture is also particularly well suited for an array configuration in which individual wavelengths are amplified independently. As shown in FIG. 13 a R-EDA array 270 includes a circulator 272, a WDM (mux/demux) 274, a waveguide array 275, an array of reflective optical components 276 that at a minimum reflect the optical input signal, and an optional monitoring module 278 for monitoring signal power, signal dispersion and/or ASE power. The reflective optical components 276 may, in some configurations, reflect pump power or perform other functions such as gain flattening. The WDM separates the optical signal 280 into its constituent wavelengths, which are amplified and conditioned on a channel-by-channel basis. Any of the previously described pumping schemes (generically 282) can be used to pump each individual channel although end-pumping does preclude the integration of the monitoring module.

Figure 14A:
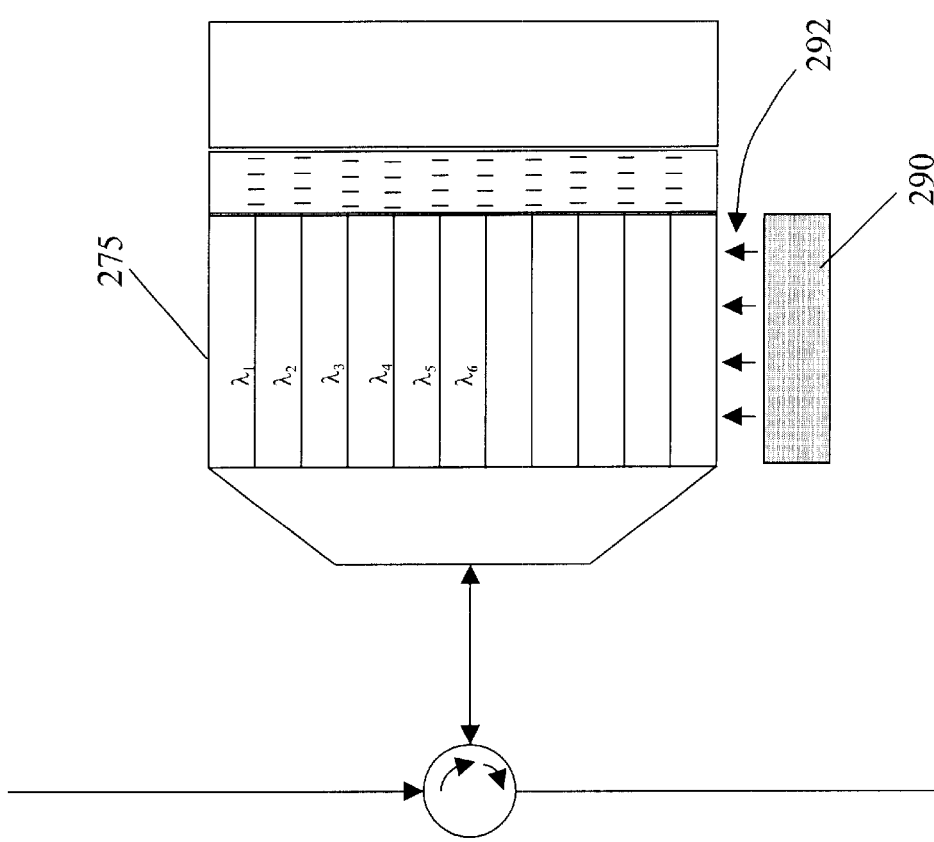
FIGS. 14a–14b are schematic illustrations of the R-EDFA array using two different side-pumping schemes.
Figure 14B:
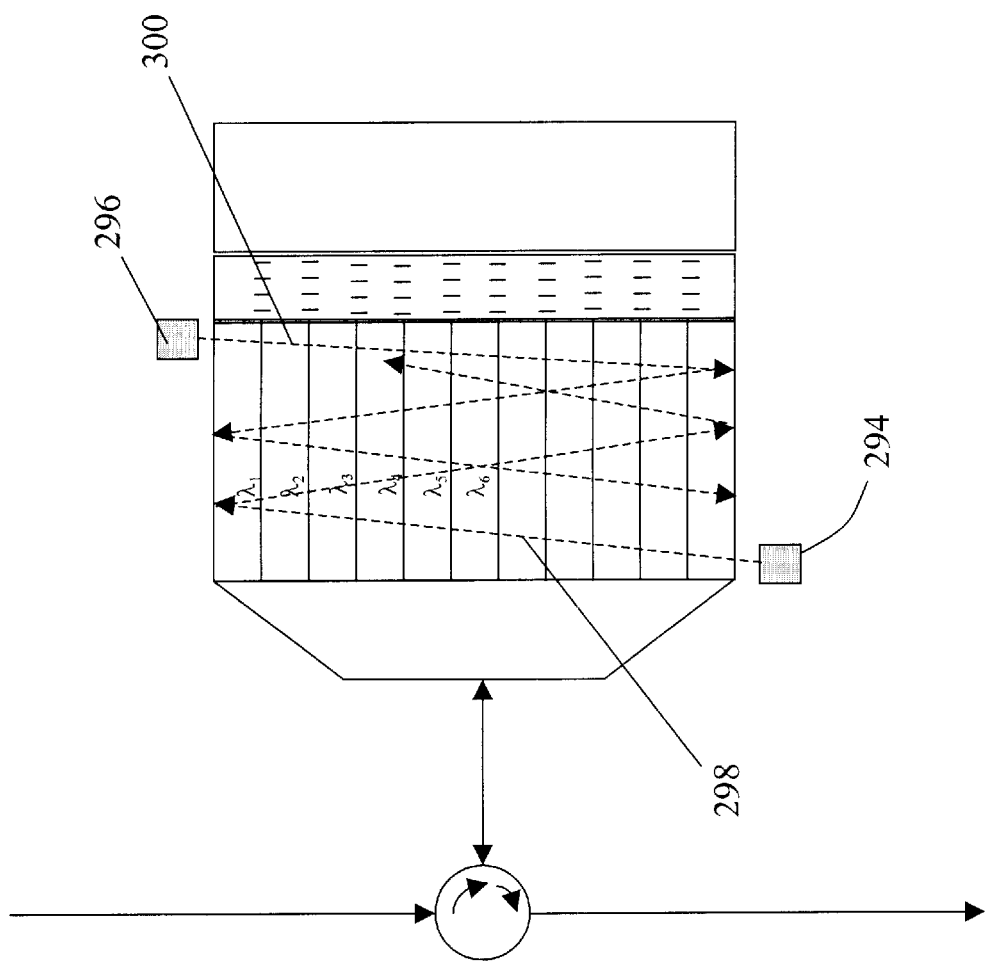
Figure 15:
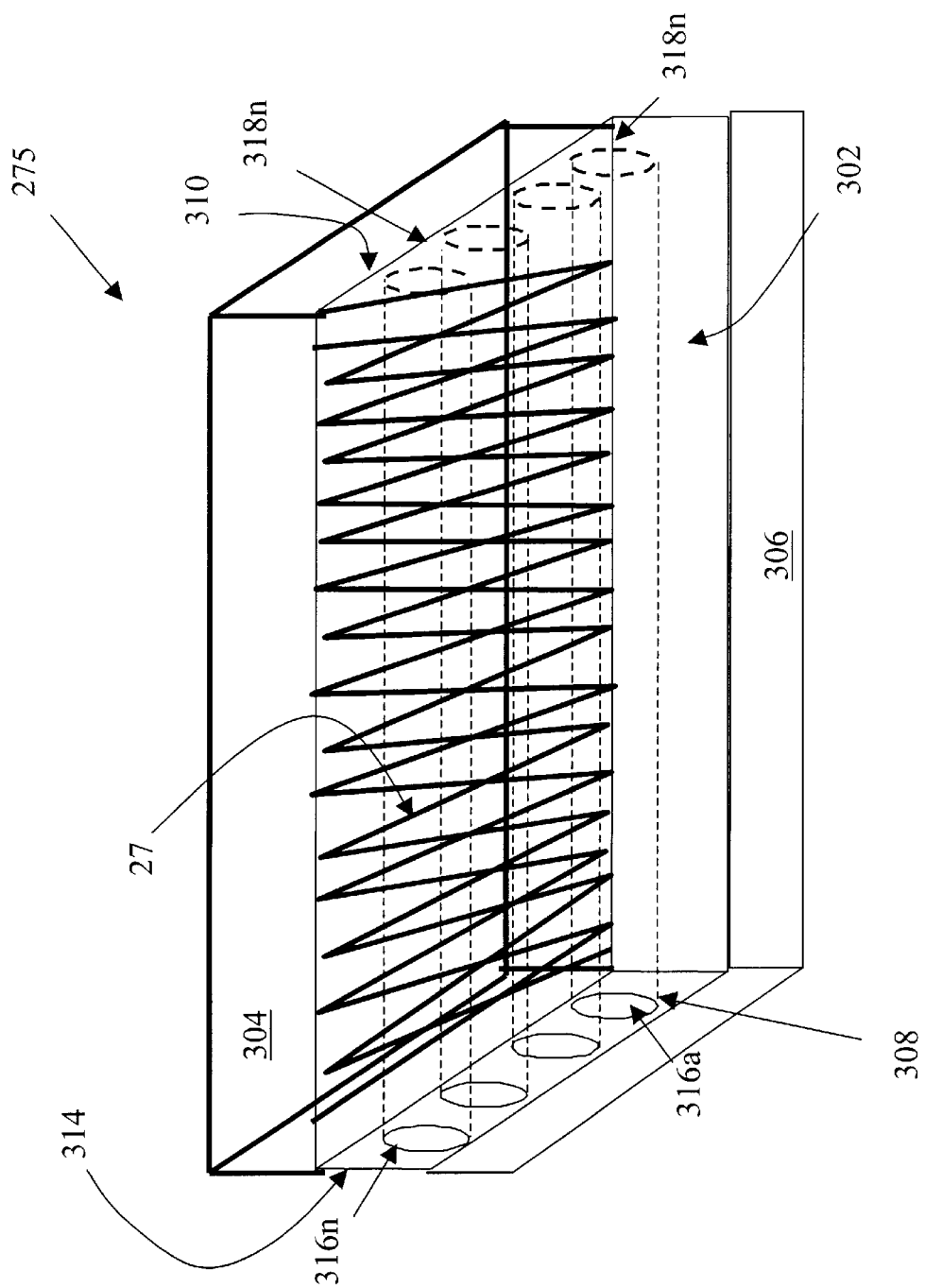
FIG. 15 is a waveguide array for use in a side-pumped R-EDA.

As shown in FIGS. 14–15, a side-pumped R-EDA array 270 is particularly promising because the pumps can be shared efficiently and the waveguides' ultra-short length works well with the side pumping geometry. As shown in FIG. 14a, a laser bar 290 spans the length of waveguide array 275 and injects a plurality of pump beams 292 transversely to the longitudinal orientation of the waveguides. The opposite side of waveguide array 275 is coated with a material to reflect light at the pump wavelength. As shown in FIG. 14b, a pair of pump lasers 294 and 296 are positioned on opposite sides and opposite ends of the waveguide array and orientated such that pump beams 298 and 300, respectively, transverse the waveguides and zig-zag back-and-forth as the pump beams travel longitudinally down the waveguide. Both sides of the waveguide array are coated with a material suitable for reflecting pump light.

As shown in FIG. 15, waveguide array 275 has an inner cladding layer 302 sandwiched between a pair of outer cladding layers 304 and 306, which together confine and guide the pump light within the inner cladding. A plurality of active core elements 308a–308n are arranged longitudinally in inner cladding layer 302 to define optical signal paths between respective pairs of the input ports 304a–304n and output ports 306a–306n. The inner cladding layer and each of the active core elements confine respective optical signals inside the active core elements as they travel the optical signal paths. Surface 308 at the input ports is substantially transmissive at the signal wavelength to both input and output couple the optical signals to and from the WDM. Surface 310 at the output ports is substantially reflective at the signal wavelength to reflect the optical signals and return them to the input ports. Pump light is coupled into the inner cladding layer 302 where it is confined until it is absorbed by the plurality of active core elements. The pump light which passes through or around the first active core element intercepts the second active core element, and so on. Pump absorption and thus gain is enhanced by forming reflecting surfaces 312 and 314 on opposing sides of the inner cladding layer, which cause the pump light to be reflected back-and-forth in a zigzag pattern down the waveguide traversing each active core element multiple times. The waveguide array can be made much thinner than standard double-clad fiber, hence the coupling efficiency of pump light into the core will be much higher. This waveguide and side-pumped amplifiers are described in co-pending U.S. patent application Ser. No. 09/951,194 entitled "Side-Pumped Multi-Port Optical Amplifier and Method of Manufacturing using Fiber Drawing Technologies", which is hereby incorporated by reference.

Figure 16:
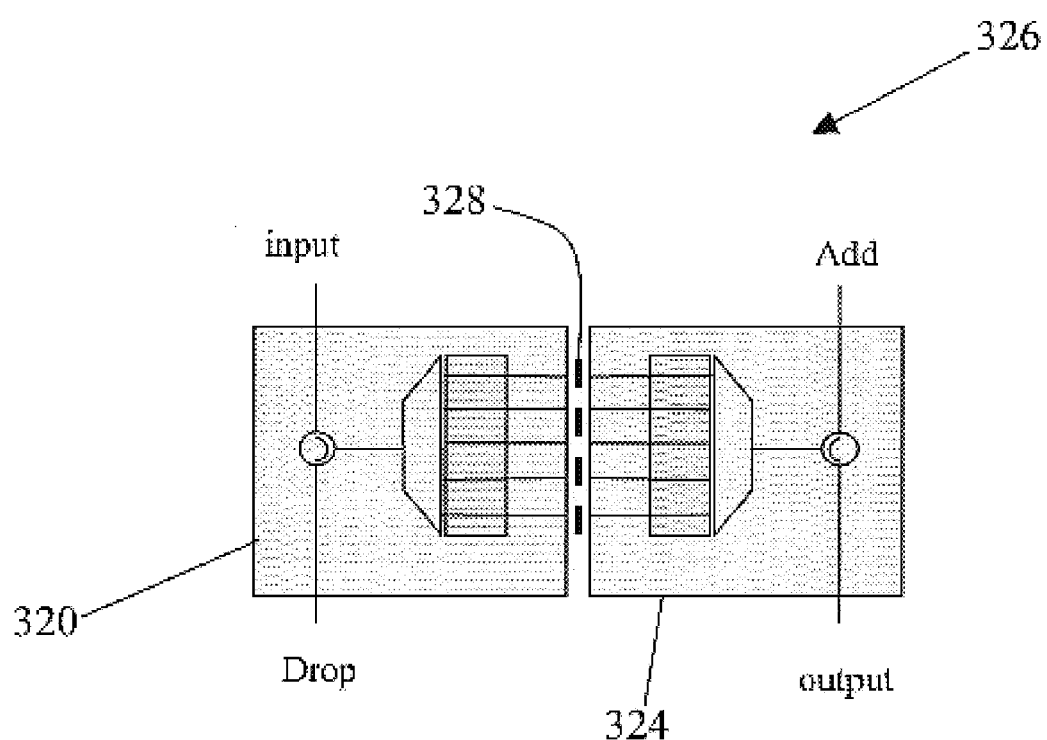
FIG. 16 is a schematic illustration of the R-EDA array configured as an add/drop switch.

As shown in FIG. 16, a pair of R-EDA arrays 320 and 322 can be configured to create an amplified add/drop switch 324. The arrays (without reflectors) are placed back-to-back with an array of flip mirrors or switchable gratings 328 positioned between respective output ports. To pass a channel, the corresponding mirror/grating is switched down so that the input signal passes through the channel in array 320 and is free-spaced coupled to the opposite channel in array 322 where it is recombined with the other wavelengths and directed to the output. To add/drop a channel, the corresponding mirror/grating is switched up so that the input signal is reflected and dropped. The added signal is amplified, reflected and recombined with the other wavelengths from the input and directed to the output. This scheme allows multiple wavelengths to be add/dropped simultaneously and amplified.

While several illustrative embodiments of the invention have been shown and described, numerous variations and alternate embodiments will occur to those skilled in the art. For example, the ultra-short R-EDA could be pumped using a conventional single-mode pump laser and WDM coupler. Such variations and alternate embodiments are contemplated, and can be made without departing from the spirit and scope of the invention as defined in the appended claims.

We claim:

1. An optical amplifier, comprising:
   A circulator having an input port for receiving an optical signal, an I/O port to output the optical signal and an output port;
   An optical waveguide that is coupled at one end to the circulator's I/O port to receive the optical signal, said waveguide having a core and an inner cladding formed of a multi-component glass composition having a glass network former is selected from one of phosphorus oxide $P_2O_2$, germanium oxide $GeO_2$ or telluride oxide $TeO_2$ with said core being co-doped with 0.5 to 5 wt. % erbium and 0.5 to 30 wt. % ytterbium;
   A multi-mode pump that directs pump light into the waveguide inner cladding such that the pump light is partially absorbed in the core thereby amplifying the optical signal as it passes through the waveguide core; and
   A signal reflector coupled to the open end of the optical amplifier to reflect the optical signal back through the waveguide core back to the I/O port, which outputs the twice-amplified optical signal at the output port.

2. The optical amplifier of claim 1, wherein the multi-component glass comprises the glass network former from 30 to 80 weight percent, a glass network modifier MO from 2 to 40 weight percent, and a glass network intermediator XO from 2 to 30 weight percent, wherein MO is selected from alkaline earth oxides and transition metal oxides consisting of BaO, BeO, MgO, SrO, CaO, ZnO, PbO and mixtures thereof, and XO is selected from PbO, ZnO, $WO_3$, $Al_2O_3$, $B_2O_3$, $Y_2O_3$, $La_2O_3$, and mixtures thereof.

3. The optical amplifier of claim 2, wherein the multi-component glass comprises glass network modifier MO from 5 to 40 weight percent, and a glass network intermediator XO from 5 to 30 weight percent.

4. The optical amplifier of claim 1, wherein the total doping concentration of erbium and ytterbium exceeds 10 wt. %.

5. The optical amplifier of claim 1, wherein the ytterbium doping concentration exceeds 15 wt. %.

6. The optical amplifier of claim 2, wherein MO includes a mixture of BaO and ZnO such that said optical waveguide has a temperature coefficient of refractive index from about $-2.0 \times 10^{-6}$ to $2.0 \times 10^{-6}$.

7. The optical amplifier of claim 2, further comprising up to 5 percent by weight of an additional network modifier $R_2O$ selected from the alkali metal oxide group consisting of $Li_2O$, $K_2O$, $Na_2O$, $Rb_2O$, and mixtures thereof.

8. The optical amplifier of claim 2, wherein the multi-component glass is an alkali-free glass substantially free of an additional network modifier $R_2O$ selected from the alkali metal oxide group consisting of $Li_2O$, $K_2O$, $Na_2O$, $Rb_2O$, and mixtures thereof.

9. The optical amplifier of claim 1, further comprising a fused-fiber coupler including a multi-mode fiber and an input double clad fiber that are fused together into an output double clad fiber, said multi-mode, input double clad and output double clad fibers being optically coupled to the pump, I/O port and optical waveguide, respectively, to couple the optical signal into the waveguide core and the pump into the inner cladding.

10. The optical amplifier of claim 1, wherein said optical waveguide inner cladding has a flat surface, further comprising:
   A total internal reflection (TIR) coupler in optical contact with the inner cladding's flat surface towards the I/O port for a length L and having a reflecting surface that forms an angle of taper α with said inner cladding, said TIR coupler being effective to reflect the pump light at a preselected angle of incidence θinc for the principal ray and satisfy a TIR condition at its reflecting surface for folding the pump light into the fiber, wherein said pump light also satisfies a TIR condition for guiding the pump light inside the inner cladding.

11. The optical amplifier of claim 10, wherein pump is oriented substantially normal to the waveguide so that the angle of incidence $\theta_{inc}$ at the reflecting surface is substantially equal to the angle of taper α.

12. The pump coupler of claim 11, wherein said inner cladding has a diameter W, said pump light has a beam width d, the refractive indices of the TIR coupler, the inner cladding and an outer cladding are $n_{coupler}$, $n_{clad}$ and next respectively, and said pump light is incident on the reflecting surface a distance D from the starting point of the taper as projected onto the fiber, said folding and guiding TIR conditions and said input and output coupling conditions being as follows:

$$\alpha > arc\ \sin(1/n_{coupler}) \quad (1)$$
$$\theta_L > arc\ \sin(n_{ext}/n_{clad}) \quad (2)$$
$$(\|D\| + d/2)/\cos(\theta_i) < L \quad (3)$$
$$L < (\|D\| - d/2)/\cos(\theta_i) + 2W\tan(\theta_L) \quad (4)$$
$$d < 2W\tan(\theta_L)\cos(\theta_i) \quad (5)$$

where $\theta_i$ is an angle of incidence of pump light at the interface of the TIR coupler and inner cladding and $\theta_L$ is a launch angle of pump light into the fiber.

13. The amplifier of claim 10, wherein said waveguide includes a passive waveguide having an undoped core surrounded by the inner cladding, which is optically coupled to an active waveguide having a doped core surrounded by the inner cladding, said TIR coupler being mounted on said passive waveguide to fold the pump light into said passive waveguide and guide the pump light through and excite the entire length of the doped core in the active waveguide.

14. The amplifier of claim 10, further comprising a pump reflector coupled towards the open end of the optical amplifier to reflect the pump light back through the inner cladding.

15. The optical amplifier of claim 14, wherein a broad-band reflector comprises both said signal reflector and said pump reflector.

16. The optical amplifier of claim 15, wherein said pump light comprises central modes that are readily absorbed in the core and higher order modes that remain substantially in the inner cladding during the first pass, said pump reflector being configured to reflect said higher order modes so that they overlap with and are absorbed by the core on the return pass.

17. The optical amplifier of claim 14, wherein said waveguide is an optic fiber, further comprising a double-clad fiber spliced to said optic fiber, said signal and pump reflectors being formed on said double-clad fiber.

18. The optical amplifier of claim 1, wherein said signal reflector is substantially transmissive to the pump light, further comprising a collimating lens that is positioned to couple pump light into the inner cladding at the open end of the amplifier.

19. The amplifier of claim 18, further comprising a pump reflector positioned towards the I/O port to reflect the pump light back through the inner cladding.

20. The amplifier of claim 19, further comprising a passive waveguide having a core and an inner cladding coupled between the waveguide and the I/O port, wherein said pump reflector comprises a prism mounted on the inner cladding of the passive waveguide to outcouple, reflect and return the pump light to the inner cladding for a second pass through the optical waveguide.

21. The amplifier of claim 19, further comprising a passive waveguide having a core and an inner cladding coupled between the waveguide and the I/O port, wherein said pump reflector comprises a grating written on the inner cladding of the passive waveguide to reflect the pump light for a second pass through the optical waveguide.

22. The amplifier of claim 19, wherein an interior surface of the circulator is coated to form the pump reflector.

23. The optical amplifier of claim 1, wherein the optical waveguide comprises a planar waveguide structure in which the core is arranged in the inner cladding, which is sandwiched between a pair of outer cladding layers with a reflecting surface arranged on one side of the inner cladding layer, said multi-mode pump arranged to direct pump light into the inner cladding layer transverse to the orientation of the core such that pump light is absorbed in a portion of the core and reflect off the reflecting surface such that pump light is absorbed in a different portion of the core.

24. The optical amplifier of claim 23, wherein the reflector is on one end of the planar waveguide structure.

25. The optical amplifier of claim 23, wherein the multi-mode pump comprises a laser bar with a plurality of emitters, said laser bar being arranged substantially parallel to the longitudinal orientation of the core such that the plurality of pump beams are directed substantially transverse to the core.

26. The optical amplifier of claim 23, further comprising a second reflecting surface on the other side of the inner cladding, where in the multi-mode pump is arranged such that the pump light bounces back and forth between the reflecting surfaces in said transverse direction and in said longitudinal direction in a zigzag pattern.

27. The optical amplifier of claim 23, further comprising a WDM between the I/O port and the optical waveguide that demultiplexes the optical signal into individual wavelength signals, wherein the planar waveguide structure comprises a plurality of cores arranged next to each other in said inner cladding to amplify respective wavelength signals, said pump light being absorbed in a portion of each said core.

28. The optical amplifier of claim 1, wherein the circulator further comprises a pump port for receiving pump light from the multi-mode pump and a beam combiner for combining the pump light with the optical signal inside the circulator so that at the I/O port the optical signal is coupled into the core and the pump light is coupled into the inner cladding.

29. The optical amplifier of claim 28, wherein the circulator further comprises a polarizer prism and a collimating lens on either side of the I/O port, said beam combiner comprising a mirror positioned between said polarizer prism and the collimating lens.

30. The optical amplifier of claim 28, wherein the beam combiner is positioned between an optically active element and a polarizer prism just prior to the I/O port.

31. The optical amplifier of claim 28, wherein the circulator further comprises birefringent crystal that is formed from two complementary pieces of birefringent crystalline material of the same crystal orientation, which are coated with a material that is substantially transmitting to the optical signal and substantially reflective to the pump light, and bonded together such that the birefringent crystal combines a pair of orthogonally polarized optical signals to form the optical signal along an optical path at the I/O port and couples the pump light into said optical path.

32. The optical amplifier of claim 1, wherein said pump light comprises central modes that are readily absorbed in the core and higher order modes that remain substantially in the inner cladding during the first pass, further comprising pump reflector configured to reflect said higher order modes so that they overlap with and are absorbed by the core on a return pass.

33. The optical amplifier of claim 32, wherein said optical signal and said pump light are counter propagating.

34. The optical amplifier of claim 33, further comprising a passive waveguide having a core and an inner cladding coupled between the waveguide and the I/O port, wherein said pump reflector comprises a prism mounted on the inner cladding of the passive waveguide to outcouple, reflect and return the pump light to the inner cladding for the return pass.

35. The amplifier of claim 33, further comprising a passive waveguide having a core and an inner cladding coupled between the waveguide and the I/O port, wherein said pump reflector comprises a grating written on the inner cladding of the passive waveguide to reflect the pump light for the return pass.

36. The optical amplifier of claim 32, wherein said optical signal and said pump light are co-propagating.

37. The optical amplifier of claim 36, wherein said pump reflector is tilted to couple the higher order modes into the central modes for absorption in the core.

38. The optical amplifier of claim 36, wherein said pump reflector is curved to couple the higher order modes into the central modes for absorption in the core.

39. The optical amplifier of claim 1, further comprising a reflective-type optical component between the optical waveguide and the reflector.

40. The optical amplifier of claim 1, wherein the reflector transmits a portion of the optical signal, further comprising art optical monitoring component coupled to the reflector opposite the optical fiber.

41. The optical amplifier of claim 1, wherein the optical signal comprises a plurality of component signals at different wavelengths, further comprising a mux/demux positioned between the circulator's I/O port and a plurality of said optical waveguides, and a like plurality of said reflectors.

42. An optical amplifier, comprising:
  A circulator having an input port for receiving an optical signal, an I/O port to output the optical signal and an output port;
  An optical waveguide less than 10 cm in length that is coupled at one end to the circulator's I/O port to receive the optical signal, said waveguide having a core and an inner cladding formed of a multi-component glass composition that comprises a glass network former from 30 to 80 weight percent, a glass network modifier MO from 2 to 40 weight percent, and a glass network intermediator XO from 2 to 30 weight percent, wherein MO is selected from alkaline earth oxides and transition metal oxides consisting of BaO, BeO, MgO, SrO, CaO, ZnO, PbO and mixtures thereof, and XO is selected from PbO, ZnO, $WO_3$, $Al_2O_3$, $B_2O_3$, $Y_2O_3$, $La_2O_3$, and mixtures thereof, wherein said core is co-doped with erbium-ytterbium;

A multi-mode pump that directs pump light into the waveguide inner cladding such that the pump light is partially absorbed in the core thereby amplifying the optical signal as it passes through the waveguide core; and A signal reflector coupled to the open end of the optical amplifier to reflect the optical signal back through the waveguide core back to the I/O port, which outputs the twice-amplified optical signal at the output port.

43. The optical amplifier of claim 42, wherein the glass network former is selected from one of phosphorus oxide $P_2O_2$, germanium oxide $GeO_2$ or telluride oxide $TeO_2$.

44. The optical amplifier of claim 42, wherein the optical waveguide core is doped with 0.5 to 5 wt. % erbium and 0.5 to 30 wt. % ytterbium.

45. The optical amplifier of claim 44, wherein the total doping concentration and ytterbium exceeds 10 wt. %.

46. The optical amplifier of claim 44, wherein the ytterbium doping concentration exceeds 15 wt. %.

47. The optical amplifier of claim 42, wherein MO includes a mixture of BaO and ZnO such that said optical waveguide has a temperature coefficient of refractive index from about $-2.0 \times 10^{-6}$ to $2.0 \times 10^{-6}$.

48. The optical amplifier of claim 42, further comprising up to 5 percent by weight of an additional network modifier $R_2O$ selected from the alkali metal oxide group consisting of $Li_2O$, $K_2O$, $Na_2O$, $Rb_2O$, and mixtures thereof.

49. The optical amplifier of claim 42, wherein the multi-component glass is an alkali-free glass substantially free of an additional network modifier $R_2O$ selected from the alkali metal oxide group consisting of $Li_2O$, $K_2O$, $Na_2O$, $Rb_2O$, and mixtures thereof.

50. An optical amplifier, comprising:

A circulator having an input port for receiving a multiplexed optical signal, an I/O port to output the optical signal and an output port;

A mux/demux that demultiplexes the optical signal into a plurality of optical signals at different wavelengths;

An optical waveguide less than 10 cm in length that is coupled at one end to the circulator's I/O port to receive the optical signal, said waveguide having a plurality of core elements arranged longitudinally in an inner cladding layer and sandwiched between a pair of outer cladding layers, which are formed of a similar multi-component glass composition with said core elements being co-doped with erbium-ytterbium, and a reflecting surface arranged on one side of the inner cladding layer;

A multi-mode pump that directs pump light into the inner cladding layer transverse to the longitudinal orientation of the core elements such that pump light is absorbed in portions of the core elements, reflects off the reflecting surface and is further absorbed in different portions of the core elements thereby amplifying the optical signals as they pass through the respective core elements; and A signal reflector coupled to the open end of the optical amplifier to reflect the optical signals back through the core elements, the mux/demux and back to the I/O port, which outputs the twice-amplified multiplexed optical signal at the output port.

51. The optical amplifier of claim 50, wherein the signal reflector is on one end of the optical waveguide.

52. The optical amplifier of claim 50, wherein the multi-mode pump comprises a laser bar with a plurality of emitters, said laser bar being arranged substantially parallel to the longitudinal orientation of the core elements such that the plurality of pump beams are directed substantially transverse to the core elements.

53. The optical amplifier of claim 50, further comprising a second reflecting surface on the other side of the inner cladding, wherein the multi-mode pump is arranged such that the pump light bounces back and forth between the reflecting surfaces in said transverse direction and in said longitudinal direction in a zigzag pattern.

54. An optical amplifier, comprising:

A circulator having an input port for receiving an optical signal, an I/O port to output the optical signal and an output port, A first section of passive double-clad fiber (DCF) coupled to the I/o port;

A section of active DCF less than 10 cm in length that is coupled at one end to the first section of passive DCF to receive the optical signal, said active DCF having a core and an inner cladding formed of a multi-component glass composition with said core being co-doped with erbium-ytterbium;

A second section of passive DCF coupled to the active DCF;

A multi-mode pump that pump light into the active DCF's inner cladding such that the pump light is partially absorbed in the core thereby amplifying the optical signal as it passes through the fiber core; and A signal reflector formed on the second section of passive DCF to reflect the optical signal back through the waveguide core back to the I/O port, which outputs the twice-amplified optical signal at the output port.

55. The optical amplifier of claim 54, further comprising a fused-fiber coupler including a multi-mode fiber that is optically coupled to pump and an input double clad fiber that are fused together into an output double clad fiber, said input double clad and output double clad fibers being fusion spliced to the first passive DCT and the active DCF, respectively, to couple the optical signal into the fiber core and the pump into the inner cladding.

56. The optical amplifier of claim 54, wherein said first passive DCF has an inner cladding with a flat surface, further comprising:

A total internal reflection (TIR) coupler in optical contact with the inner cladding's flat surface towards the I/O port for a length L and having a reflecting surface that forms an angle of taper a with said inner cladding, said TIR coupler being effective to reflect the pump light at a preselected angle of incidence θinc for the principal ray and satisfy a TIR condition at its reflecting surface for folding the pump light into the first passive DCF, wherein said pump tight also satisfies a TIR condition for guiding the pump light inside the inner cladding.

57. The amplifier of claim 54, further comprising a pump reflector formed on the second passive DCF to reflect the pump light back through the inner cladding.

58. The optical amplifier of claim 57, wherein a broadband reflector comprises both said signal reflector and said pump reflector.

59. The optical amplifier of claim 57, wherein said pump light comprises central modes that are readily absorbed in the core and higher order modes that remain substantially in the inner cladding during the first pass, said pump reflector being configured to reflect said higher order modes so that they overlap with and are absorbed by the core on the return pass.

60. The optical amplifier of claim 54, wherein said signal reflector is substantially transmissive to the pump light, further comprising a collimating lens that is positioned to couple pump light into the inner cladding of the second passive DCF.

61. The amplifier of claim 60, further comprising a pump reflector formed on the first passive DCF to reflect the pump light back through the active DCF's inner cladding.

62. The amplifier of claim 61, wherein said pump reflector comprises a prism that outcouples, reflects and returns the pump light to the inner cladding for a second pass through the active DCF.

63. The amplifier of claim 61, wherein said pump reflector comprises a grating written on the inner cladding of the first passive DCF to reflect the pump light for a second pass through the active DCF.

64. An optical amplifier, comprising:

A multi-mode pump;

A circulator having an input port for receiving an optical signal, an I/O port, an output port, and a pump port for receiving pump light from the multi-mode pump, said circulator including a beam combiner that combines the pump light with the optical signal and outputs them at the I/O port;

An optical waveguide having a core and inner cladding that are coupled at one end to the circulator's I/O port to receive the optical signal and pump light, respectively, said core and inner cladding being formed of a multi-component glass composition having a glass network former is selected from one of phosphorus oxide $P_2O_2$, germanium oxide $GeO_2$ or telluride oxide $TeO_2$ with said core being co-doped with 0.5 to 5 wt. % erbium and 0.5 to 30 wt. % ytterbium such that partial absorption of the pump light in the core amplifies the optical signal as it passes through the waveguide core; and A signal reflector coupled to the open end of the optical amplifier to reflect the optical signal back through the waveguide core back to the I/O port, which outputs the twice-amplified optical signal at the output port.

65. The optical amplifier of claim 64, wherein the beam combiner comprises birefringent crystal that is formed from two complementary pieces of birefringent crystalline material of the same crystal orientation, which are coated with a material that is substantially transparent to the optical signal and substantially reflective to the pump light, and bonded together such that the birefringent crystal combines a pair of orthogonally polarized optical signals to form the optical signal along an optical path at the I/O port and couples the pump light into said optical path.

66. An optical amplifier, comprising:

A circulator having an input port for receiving an optical signal, an I/O port to output the optical signal and an output port;

An optical waveguide that is coupled at one end to the circulator's I/O port to receive the optical signal, said waveguide having a core and an inner cladding formed of a multi-component glass composition having a glass network former is selected from one of phosphorus oxide $P_2O_2$, germanium oxide $GeO_2$ or telluride oxide $TeO_2$ with said core being co-doped with 0.5 to 5 wt. % erbium and 0.5 to 30 wt. % ytterbium;

A multi-mode pump that directs pump light into the waveguide inner cladding, said pump light comprises central modes that are readily absorbed in the core thereby amplifying the optical signal as it passes through the waveguide core and higher order modes that remain substantially in the inner cladding;

A pump reflector configured to reflect said pump light so that the higher order modes overlap with and are absorbed by the core to increase amplification; and A signal reflector coupled to the open end of the optical amplifier to reflect the optical signal back through the waveguide core back to the I/O port, which outputs the twice-amplified optical signal at the output port.

67. The optical amplifier of claim 66, wherein said optical signal and said pump light are counter propagating.

68. An optical amplifier; comprising

A circulator having an input port for receiving an optical signal, an I/O port to cutout the optical signal and an output port;

An optical waveguide that is coupled at one end to the circulator's I/O port to receive the optical signal, said waveguide having a core and an inner cladding formed of a multi-component glass composition with said core being co-doped with erbium-ytterbium;

A multi-mode pump that directs pump light into the waveguide inner cladding so that said optical signal and said pump light are counter propagating, said pump light comprises central modes that are readily absorbed in the core thereby amplifying the optical signal as it passes through the waveguide core and higher order modes that remain substantially in the inner cladding;

a passive waveguide having a core and an inner cladding coupled between the optical waveguide and the I/O port A pump reflector configured to reflect said pump light so that the higher order modes overlap with and are absorbed by the core to increase amplification, said pump reflector comprising a prism mounted on the inner cladding of the passive waveguide to outcouple, reflect and return the pump light to the inner cladding for the return pass; and A signal reflector coupled to the open end of the optical amplifier to reflect the optical signal back through the waveguide core back to the I/O port, which outputs the twice-amplified optical signal at the output port.

69. An optical amplifier; comprising:

A circulator having an input port for receiving an optical signal, an I/O port to output the optical signal and an output port;

An optical waveguide that is coupled at one end to the circulator's I/O port to receive the optical signal, said waveguide having a core and an inner cladding formed of a multi-component glass composition with said core being co-doped with erbium-ytterbium;

A multi-mode pump that directs pump light into the waveguide inner cladding so that said optical signal and said pump light are counter propagating, said pump light comprises central modes that are readily absorbed in the core thereby amplifying the optical signal as it passes through the waveguide core and higher order modes that remain substantially in the inner cladding;

a passive waveguide having a core and an inner cladding coupled between the optical waveguide and the I/O port A pump reflector configured to reflect said pump light so that the higher order modes overlap with and are absorbed by the core to increase amplification, said pump reflector comprising a grating written on the inner cladding of the passive waveguide to reflect the pump light for the return pass; and A signal reflector coupled to the open end of the optical amplifier to reflect the optical signal back through the waveguide core back to the I/O port, which outputs the twice-amplified optical signal at the output port.

70. The optical amplifier of claim 66, wherein said optical signal and said pump light are co-propagating.

71. An optical amplifier; comprising

A circulator having an input port for receiving an optical signal, an I/O port to output the optical signal and an output port;

An optical waveguide that is coupled at one end to the circulator's I/O port to receive the optical signal, said waveguide having a core and an inner cladding formed of a multi-component glass composition with said core being co-doped with erbium-ytterbium;

A multi-mode pump that directs pump light into the waveguide inner cladding so that said optical signal and said pump light are co-propagating, said pump light comprises central modes that are readily absorbed in the core thereby amplifying the optical signal as it passes through the waveguide core and higher order modes that remain substantially in the inner cladding;

A pump, reflector configured to reflect said pump light so that the higher order modes overlap with and are absorbed by the core to increase amplification, wherein said pump reflector is tilted to couple the higher order modes into the central modes for absorption in the core; and A signal reflector coupled to the open end of the optical amplifier to reflect the optical signal back through the waveguide core back to the I/O port, which outputs the twice-amplified optical signal at the output port.

72. An optical amplifier; comprising:

A circulator having an input port for receiving an optical signal, an I/O port to output the optical signal and an output port;

An optical waveguide that is coupled at one end to the circulator's I/O port to receive the optical signal, said waveguide having a core and an inner cladding formed of a multi-component glass composition with said core being co-doped with erbium-ytterbium;

A multi-mode pump that directs pump light into the waveguide inner cladding so that said optical signal and said pump light are co-propagating, said pump light comprises central modes that are readily absorbed in the core thereby amplifying the optical signal as it passes through the waveguide core and higher order modes that remain substantially in the inner cladding;

A pump reflector configured to reflect said pump light so that the higher order modes overlap with and are absorbed by the core to increase amplification, wherein said pump reflector is curved to couple the higher order modes into the central modes for absorption in the core; and A signal reflector counted to the open end of the optical amplifier to reflect the optical signal back through the wave-guide core back to the I/O port, which outputs the twice-amplified optical signal at the output port.

* * * * *